(12) United States Patent
Sullivan

(10) Patent No.: US 10,369,420 B2
(45) Date of Patent: *Aug. 6, 2019

(54) MULTI-LAYER GOLF BALL

(71) Applicant: Acushnet Company, Fairhaven, MA (US)

(72) Inventor: Michael J. Sullivan, Old Lyme, CT (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,216

(22) Filed: Jul. 27, 2018

(65) Prior Publication Data

US 2018/0345085 A1 Dec. 6, 2018

Related U.S. Application Data

(60) Continuation of application No. 15/678,179, filed on Aug. 16, 2017, now Pat. No. 10,046,209, which is a continuation of application No. 15/083,653, filed on Mar. 29, 2016, now Pat. No. 9,795,837, which is a continuation of application No. 14/865,104, filed on Sep. 25, 2015, now Pat. No. 9,295,884, which is a continuation-in-part of application No. 14/800,753, filed on Jul. 16, 2015, now Pat. No. 9,409,062, which is a division of application No. 13/466,357, filed on May 8, 2012, now Pat. No. 9,084,917, which is a continuation-in-part of application No. 13/416,102, filed on Mar. 9, 2012, now Pat. No. 8,360,902, which is a continuation of application No. 13/397,906, filed on Feb. 16, 2012, now Pat. No. 8,444,507, which is a continuation of application No. 13/024,901, filed on Feb. 10, 2011, now Pat. No. 8,123,632, which is a
(Continued)

(51) Int. Cl.
| | |
|---|---|
| *A63B 37/06* | (2006.01) |
| *A63B 37/00* | (2006.01) |
| *C08L 23/08* | (2006.01) |
| *C08K 5/20* | (2006.01) |

(52) U.S. Cl.
CPC ...... *A63B 37/0094* (2013.01); *A63B 37/0003* (2013.01); *A63B 37/004* (2013.01); *A63B 37/008* (2013.01); *A63B 37/0024* (2013.01); *A63B 37/0027* (2013.01); *A63B 37/0031* (2013.01); *A63B 37/0039* (2013.01); *A63B 37/0043* (2013.01); *A63B 37/0045* (2013.01); *A63B 37/0062* (2013.01); *A63B 37/0063* (2013.01); *A63B 37/0064* (2013.01); *A63B 37/0066* (2013.01); *A63B 37/0076* (2013.01); *A63B 37/0087* (2013.01); *A63B 37/0092* (2013.01); *A63B 37/0096* (2013.01); *A63B 37/0059* (2013.01); *A63B 37/0078* (2013.01); *A63B 2037/0079* (2013.01); *C08K 5/20* (2013.01); *C08L 23/0876* (2013.01)

(58) Field of Classification Search
CPC .................................................. A63B 37/0076
USPC ......................................................... 473/376
See application file for complete search history.

(56) References Cited

U.S. PATENT DOCUMENTS

| | | |
|---|---|---|
| 5,782,707 A | 7/1998 | Yamagishi et al. |
| 6,596,801 B2 | 7/2003 | Higuchi et al. |

(Continued)

*Primary Examiner* — Raeann Gorden
(74) *Attorney, Agent, or Firm* — Mandi B. Milbank

(57) ABSTRACT

Multi-piece golf balls having a multi-layered solid core and multi-layered cover are provided.

6 Claims, 2 Drawing Sheets

Related U.S. Application Data continuation of application No. 12/233,776, filed on Sep. 19, 2008, now Pat. No. 7,887,437, which is a continuation-in-part of application No. 12/048,003, filed on Mar. 13, 2008, now abandoned, which is a continuation-in-part of application No. 11/767,070, filed on Jun. 22, 2007, now abandoned.

(56) References Cited

U.S. PATENT DOCUMENTS

| | | |
|---|---|---|
| 6,634,961 B2 | 10/2003 | Higuchi et al. |
| 6,679,791 B2 | 1/2004 | Watanabe |
| 6,686,436 B2 | 2/2004 | Iwami |
| 6,786,836 B2 | 9/2004 | Higuchi et al. |
| 6,987,159 B2 | 1/2006 | Iwami |
| 7,086,969 B2 | 8/2006 | Higuchi et al. |
| 7,147,578 B2 | 12/2006 | Nesbitt et al. |
| 7,153,224 B2 | 12/2006 | Higuchi et al. |
| 7,175,542 B2 | 2/2007 | Watanabe et al. |
| 7,211,008 B2 | 5/2007 | Sullivan et al. |
| 7,226,367 B2 | 6/2007 | Higuchi et al. |
| 7,357,736 B2 | 4/2008 | Sullivan et al. |
| 7,722,482 B2 | 5/2010 | Sullivan et al. |
| 7,887,438 B2 | 2/2011 | Sullivan et al. |
| 8,382,610 B2 | 2/2013 | Sullivan et al. |
| 8,974,318 B1 | 3/2015 | Ogg et al. |
| 9,044,647 B2 | 6/2015 | Sullivan |
| 9,084,917 B2 | 7/2015 | Sullivan |
| 9,295,884 B2 * | 3/2016 | Sullivan ............ A63B 37/0092 |
| 9,387,366 B2 | 7/2016 | Sullivan |
| 9,750,984 B2 | 9/2017 | Sullivan |
| 9,795,837 B2 * | 10/2017 | Sullivan ............ A63B 37/0092 |
| 9,901,785 B2 * | 2/2018 | Sullivan ............ A63B 37/0076 |
| 2003/0153404 A1 | 8/2003 | Kennedy |
| 2004/0029648 A1 | 2/2004 | Kato |
| 2009/0011865 A1 | 1/2009 | Sullivan et al. |
| 2009/0017940 A1 | 1/2009 | Sullivan et al. |
| 2009/0227394 A1 | 9/2009 | Bulpett et al. |

* cited by examiner

MULTI-LAYER GOLF BALL

CROSS-REFERENCE TO RELATED APPLICATIONS

This application is a continuation of U.S. patent application Ser. No. 15/678,179, filed Aug. 16, 2017; which is a continuation of U.S. patent application Ser. No. 15/083,653, filed Mar. 29, 2016, now U.S. Pat. No. 9,795,837; which is a continuation of U.S. patent application Ser. No. 14/865,104, filed Sep. 25, 2015, now U.S. Pat. No. 9,295,884; which is a continuation-in-part of U.S. patent application Ser. No. 14/800,753, filed Jul. 16, 2015, now U.S. Pat. No. 9,409,062; which is a divisional of U.S. patent application Ser. No. 13/466,357, filed May 8, 2012, now U.S. Pat. No. 9,084,917; which is a continuation-in-part of U.S. patent application Ser. No. 13/416,102, filed Mar. 9, 2012, now U.S. Pat. No. 8,360,902; which is a continuation of U.S. application Ser. No. 13/397,906, filed on Feb. 16, 2012, now U.S. Pat. No. 8,444,507; which is a continuation of U.S. patent application Ser. No. 13/024,901, filed on Feb. 10, 2011, now U.S. Pat. No. 8,123,632; which is a continuation of U.S. patent application Ser. No. 12/233,776, filed Sep. 19, 2008, now U.S. Pat. No. 7,887,437; which is a continuation-in-part of U.S. patent application Ser. No. 12/048,003, filed Mar. 13, 2008, now abandoned; which is a continuation-in-part of U.S. patent application Ser. No. 11/767,070, filed Jun. 22, 2007, now abandoned. The entire disclosure of each of these references is hereby incorporated herein by reference.

FIELD OF THE INVENTION

The present invention generally relates to multi-piece golf balls having a multi-layered solid core and multi-layered cover. In one preferred embodiment, a five-piece ball is formed, wherein the inner cover layer is made of a thermoplastic composition. The outer cover layer is made of a composition comprising a polyurethane, polyurea, or copolymer or blend thereof. In a second preferred embodiment, a six-piece ball is formed, wherein the inner and intermediate cover layers are made of thermoplastic materials.

BACKGROUND OF THE INVENTION

Golf balls containing multi-layered cores and covers are known. For example, U.S. Patent Application Publication No. 2009/0227394 to Bulpett et al. discloses a multi-layered core comprising: a) an inner core formed from a first thermoset rubber composition; b) an intermediate core layer formed from a partially-neutralized or highly-neutralized ionomer composition; and c) an outer core formed from a second thermoset rubber composition. A cover layer having a thickness of from 0.01 inches to 0.05 inches and a surface hardness of 60 Shore D or less is formed around the core.

U.S. Patent Application Publication No. 2009/0017940 to Sullivan et al. discloses golf balls having a dual-core and a single-layered cover. The dual-core includes an inner core formed from a rubber composition and an outer core layer formed from a highly neutralized polymer (HNP) composition comprising an ethylene acid copolymer. In the HNP composition, at least 80% of all acid groups are neutralized. The inner core has an outer surface hardness of less than 80 Shore C; the outer core layer has an outer surface hardness of 56 Shore D or greater; and the cover layer has a material hardness of 60 Shore D or less.

U.S. Pat. No. 7,357,736 to Sullivan et al. and U.S. Pat. No. 7,211,008 to Sullivan et al. disclose golf balls comprising: a) an inner core layer formed from a diene rubber composition; (b) an outer core layer formed from a high modulus HNP comprising a highly neutralized ethylene/(meth)acrylic acid copolymer having a modulus of from 45,000 psi to 150,000 psi; (c) an intermediate core layer disposed between the inner core layer and the outer core layer and formed from a low modulus HNP composition comprising a highly neutralized ethylene/(meth)acrylic acid/alkyl (meth)acrylate copolymer having a modulus of from 1,000 psi to 50,000 psi.

U.S. Pat. No. 7,226,367 to Higuchi et al. discloses a golf ball comprising a solid core consisting of a center core and outer core, wherein at least one of the core layers is made of a rubber composition, and wherein the center core has a JIS-C hardness of 40 to 60 on its center and a JIS-C hardness of 55 to 75 on its surface.

U.S. Pat. No. 7,147,578 to Nesbitt et al. discloses golf balls containing a dual-core. The inner core (center) and outer core layer may be formed from a thermoset material or a thermoplastic material. The '578 patent discloses suitable thermoset materials as including polybutadiene or any natural or synthetic elastomer, metallocene polyolefins, polyurethanes, silicones, polyamides, and polyureas. Suitable thermoplastic materials are described as including ionomers, polyurethane elastomers, and combinations thereof.

U.S. Pat. No. 7,086,969 to Higuchi et al. discloses a multi-piece golf ball comprising a dual-core having a center and outer core layer; and a dual-cover having an inner cover layer and outer cover layer. The center is made from a rubber composition and has a JIS-C hardness of 40 to 60 in its center and a JIS-C hardness of 55 to 75 on its surface. The outer core is also made of rubber and has a JIS-C surface hardness of 75 to 95. The inner cover layer has a Shore D hardness of 50 to 80, and the outer cover layer has a Shore D hardness of 35 to 60.

U.S. Pat. No. 6,987,159 to Iwami discloses a solid golf ball with a solid core and a polyurethane cover, wherein the difference in Shore D hardness between a center portion and a surface portion of the solid core is at least 15, the polyurethane cover has a thickness (t) of not more than 1.0 mm and is formed from a cured urethane composition having a Shore D hardness (D) of from 35 to 60, and a product oft and D ranges from 10 to 45.

U.S. Pat. No. 6,786,836 to Higuchi et al. discloses a golf ball comprising a solid core and cover, wherein the core is a hot-molded product of a rubber composition, and the cover is primarily composed of thermoplastic or thermoset polyurethane elastomer, polyester elastomer, ionomer resin, polyolefin elastomer, or mixtures thereof.

U.S. Pat. No. 6,686,436 to Iwami discloses a golf ball having a solid core made of rubber and a polyurethane cover, wherein the difference in Shore D hardness between a center portion and a surface portion of the solid core is at least 15, and the polyurethane cover is obtained by curing a composition comprising an isocyanate group-terminated urethane prepolymer and aromatic polyamide compound.

U.S. Pat. No. 6,679,791 to Watanabe discloses a multi-piece golf ball which includes a rubbery elastic core, a cover having a plurality of dimples on the surface thereof, and at least one intermediate layer between the core and the cover. The intermediate layer is composed of a resin material which is harder than the cover. The elastic core has a hardness which gradually increases radially outward from the center to the surface thereof. The center and surface of the elastic core have a hardness difference of at least 18 JIS-C hardness units.

U.S. Pat. Nos. 6,634,961, 7,086,969, and 7,153,224, all to Higuchi et al., disclose a multi-piece golf ball comprising a solid core consisting of a center core and outer core; and an inner cover and outer cover layer, wherein the solid core is molded from a rubber composition containing polybutadiene rubber; another diene rubber; an unsaturated carboxylic acid; an organo-sulfur compound; an inorganic filler; and an organic peroxide.

U.S. Pat. No. 5,782,707 to Yamagishi et al. discloses a three-piece solid golf ball consisting of a solid core, an intermediate layer, and a cover, wherein the hardness is measured by a JIS-C scale hardness meter, the core center hardness is up to 75 degrees, the core surface hardness is up to 85 degrees, the core surface hardness is higher than the core center hardness by 8 to 20 degrees, the intermediate layer hardness is higher than the core surface hardness by at least 5 degrees, and the cover hardness is lower than the intermediate layer hardness by at least 5 degrees.

There is a continuing need in the golf ball industry for improved core and cover constructions in golf balls. Particularly, there is a need for golf balls having high resiliency and other properties that will allow players to generate higher initial ball speed and less initial ball spin when driving the ball off the tee, potentially resulting in longer overall distance when the ball is struck by a driver.

SUMMARY OF THE INVENTION

The present invention provides multi-piece golf balls comprising a multi-layered solid core and multi-layered solid cover.

In one embodiment, the present invention is directed to a golf ball consisting essentially of the following components. First, the ball includes an inner core layer (center) formed from a thermoset rubber composition. The center has a diameter of 1.2 inches or greater, a center hardness ($H_{center}$) of 60 Shore C or greater; and an outer surface hardness ($H_{center\ surface}$) of 80 Shore C or greater. The ball further includes an intermediate core layer formed from a thermoplastic composition having a material hardness ($H_{intermediate\ core\ material}$) of 83 Shore C or greater; an outer core layer formed from a highly neutralized polymer composition and having a material hardness ($H_{outer\ core\ material}$) of 35 Shore D or greater; an inner cover layer formed from a thermoplastic composition having a material hardness ($H_{inner\ cover\ material}$) of 80 Shore C to 95 Shore C; and an outer cover layer formed from a composition selected from the group consisting of polyurethanes, polyureas, and copolymer and blends thereof. Preferably, the $H_{intermediate\ core\ material}$ is greater than the $H_{inner\ cover\ material}$.

In another embodiment, the present invention is directed to a five-piece golf ball consisting essentially of: i) an inner core layer (center) formed from a thermoset rubber composition having a diameter of 1.100 to 1.400 inches, a center hardness ($H_{center}$) of 50 Shore C or greater; and an outer surface hardness ($H_{center\ surface}$) of 60 Shore C to 85 Shore C; ii) an intermediate core layer formed from a thermoplastic composition having a material hardness ($H_{intermediate\ core\ material}$) of 85 Shore C or greater; iii) an outer core layer formed from a highly neutralized polymer composition and having an outer surface hardness ($H_{outer\ core\ surface}$) of 70 Shore C to 95 Shore C; iv) an inner cover layer formed from a thermoplastic composition having a material hardness ($H_{inner\ cover\ material}$) of 80 Shore C to 95 Shore C, and v) an outer cover layer formed from a composition selected from the group consisting of polyurethanes, polyureas, and copolymer and blends thereof.

In another embodiment, the present invention is directed to a five-piece golf ball comprising a multi-layered cover which includes an inner cover layer, intermediate cover layer, and outer cover layer. More particularly, the five-piece ball consists essentially of: (a) an inner core layer (center) formed from a thermoset rubber composition having a diameter of 1.2 inches or greater, a center hardness ($H_{center}$) of 60 Shore C or greater; and an outer surface hardness ($H_{center\ surface}$) of 80 Shore C or greater; (b) an outer core layer formed from a highly neutralized polymer composition having a material hardness of ($H_{outer\ core\ material}$) of 35 Shore D or greater; (c) an inner cover layer formed from a thermoplastic composition having a material hardness ($H_{inner\ cover\ material}$) of 95 Shore C or less; (d) an intermediate cover layer formed from a thermoplastic composition having a material hardness ($H_{intermediate\ cover\ material}$) of 80 Shore C or greater, the $H_{intermediate\ cover\ material}$ being greater than the $H_{outer\ core\ material}$; and (e) an outer cover layer formed from a composition selected from the group consisting of polyurethanes, polyureas, and copolymer and blends thereof. In another embodiment, the present invention is directed to a six-piece golf ball consisting essentially of elements (a), (b), (c), (d), (e), as described in this paragraph, and an intermediate core layer formed from a thermoplastic composition having a material hardness ($H_{intermediate\ material}$) of 83 Shore C or greater.

In another embodiment, the present invention is directed to a five-piece golf ball including a dual-layered core, an inner cover layer, an intermediate cover layer, and an outer cover layer. More particularly, the five-piece ball consists essentially of: (i) an inner core layer (center) formed from a thermoset rubber composition having a diameter of 1.2 inches or greater, a center hardness ($H_{center}$) of 60 Shore C or greater; and an outer surface hardness ($H_{center\ surface}$) of 80 Shore C or greater; (ii) an outer core layer formed from a highly neutralized polymer composition having a material hardness of ($H_{outer\ core\ material}$) of 35 Shore D or greater, wherein the inner core and outer core layer, as combined together, form a core structure having a diameter of 1.40 to 1.55 inches; (iii) an inner cover layer formed from a thermoplastic composition having a material hardness ($H_{inner\ cover\ material}$) of 95 Shore C or less; (iv) an intermediate cover layer formed from a thermoplastic composition having a material hardness ($H_{intermediate\ cover\ material}$) of 80 Shore C or greater, the $H_{intermediate\ cover\ material}$ being greater than the $H_{outer\ core\ material}$ and the intermediate cover layer having a thickness of 0.020 to 0.150 inches; and (e) an outer cover layer formed from a composition selected from the group consisting of polyurethanes, polyureas, and copolymer and blends thereof. In another embodiment, the present invention is directed to a six-piece golf ball consisting essentially of elements (i), (ii), (iii), (iv), (v), as described in this paragraph, and an intermediate core layer formed from a thermoplastic composition having a material hardness ($H_{intermediate\ material}$) of 83 Shore C or greater and having a thickness of 0.015 to 0.070 inches.

In another embodiment, the present invention is directed to a six-piece golf ball consisting essentially of an inner core layer formed from a first thermoplastic composition, an intermediate core layer formed from a second thermoplastic composition, an outer core layer formed from a highly neutralized polymer composition, an inner cover layer formed from a third thermoplastic composition, an intermediate cover layer formed from a fourth thermoplastic composition, and an outer cover layer formed from a composition selected from the group consisting of polyurethanes, polyureas, and copolymers and blends thereof. The inner core layer has a diameter of 1.2 inches or greater, a center hardness of 60 Shore C or greater, and an outer surface hardness of 80 Shore C or greater. The intermediate core layer composition has a material hardness of 83 Shore C or greater. The outer core layer composition has a material hardness of 35 Shore D or greater. The inner cover layer composition has a material hardness of 95 Shore C or less. The intermediate cover layer has a material hardness of 80 Shore C or greater. The material hardness of the intermediate cover layer composition is greater than the material hardness of the outer core layer composition. In a particular aspect of this embodiment, the intermediate core layer has a thickness of from 0.015 inches to 0.070 inches. In another particular aspect of this embodiment, the intermediate cover layer has a thickness of from 0.020 inches to 0.150 inches. In another particular aspect of this embodiment, the inner core layer, the intermediate core layer, and the outer core layer form a multi-layer core having a diameter of from 1.40 inches to 1.55 inches.

In another embodiment, the present invention is directed to a five-piece golf ball consisting essentially of an inner core layer formed from a first thermoplastic composition, an intermediate core layer formed from a second thermoplastic composition, an outer core layer formed from a highly neutralized polymer composition, an inner cover layer formed from a third thermoplastic composition, and an outer cover layer formed from a composition selected from the group consisting of polyurethanes, polyureas, and copolymers and blends thereof. The inner core layer has a diameter of 1.2 inches or greater, a center hardness of 60 Shore C or greater, and an outer surface hardness of 80 Shore C or greater. The intermediate core layer composition has a material hardness of 83 Shore C or greater. The outer core layer composition has a material hardness of 35 Shore D or greater. The inner cover layer composition has a material hardness of 95 Shore C or less. The inner core layer, the intermediate core layer, and the outer core layer form a multi-layer core having a diameter of from 1.40 inches to 1.55 inches.

In another embodiment, the present invention is directed to a five-piece golf ball consisting essentially of an inner core layer formed from a first thermoplastic composition, an intermediate core layer formed from a second thermoplastic composition, an outer core layer formed from a highly neutralized polymer composition, an inner cover layer formed from a third thermoplastic composition, and an outer cover layer formed from a composition selected from the group consisting of polyurethanes, polyureas, and copolymers and blends thereof. The inner core layer has a diameter of from 1.100 inches to 1.400 inches, a center hardness of from 50 Shore C to 75 Shore C, and an outer surface hardness of from 60 Shore C to 85 Shore C. The intermediate core layer composition has a material hardness of 83 Shore C or greater. The outer core layer has an outer surface hardness of from 70 Shore C to 95 Shore C. The inner cover layer composition has a material hardness of from 80 Shore C to 95 Shore C.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION

Figure 1:
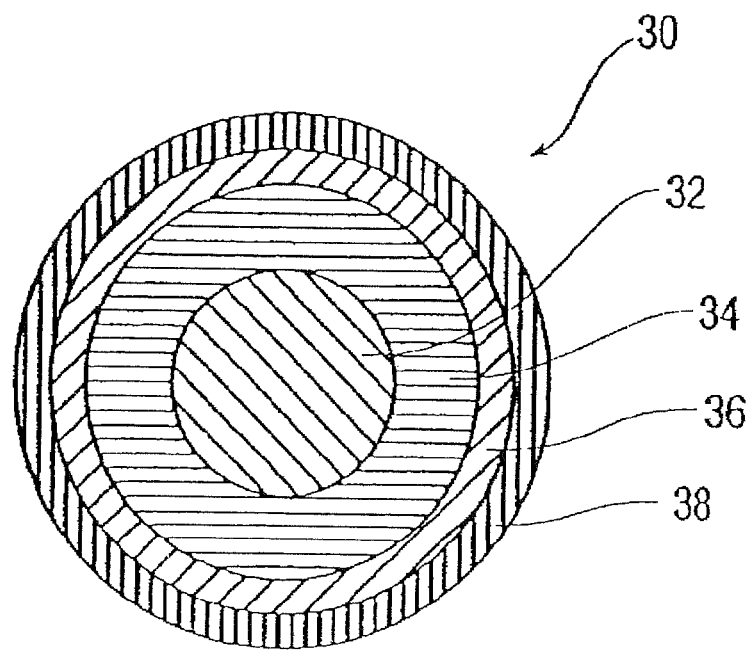
FIG. 1 is a cross-sectional view of a four-piece golf ball according to an embodiment of the present invention.

FIG. 1 shows a golf ball 30 according to an embodiment of the present invention, including an inner core layer 32, an outer core layer 34, an inner cover layer 36, and an outer cover layer 38.

Figure 2:
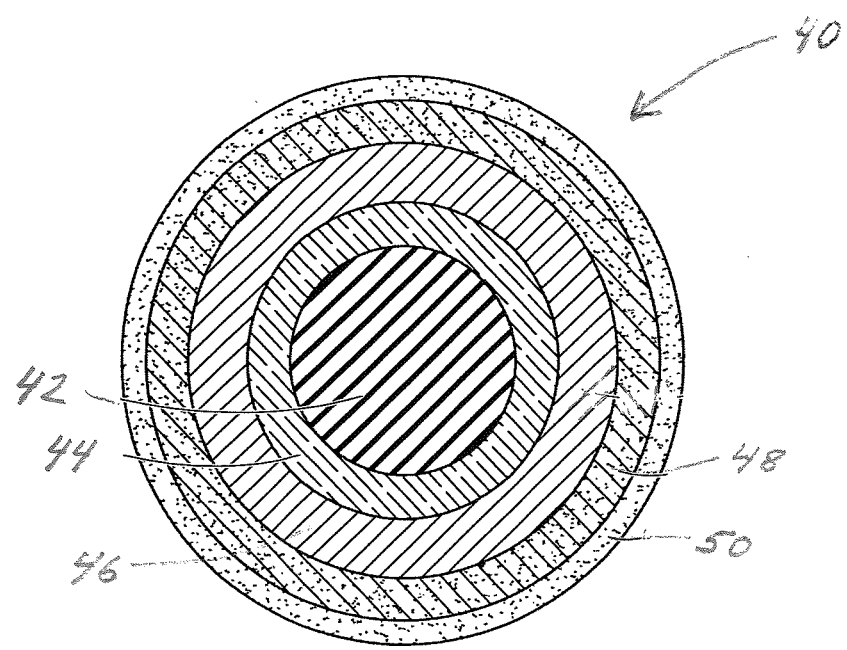
FIG. 2 is a cross-sectional view of five-piece golf ball according to an embodiment of the present invention.

FIG. 2 shows a five-piece golf ball 40 according to a second embodiment of the invention, wherein the ball includes an inner core layer (center) 42, an intermediate core layer 44, and an outer core layer 46. The ball further includes a dual-layer cover including an inner cover layer 48 and outer cover layer 50.

Figure 3:
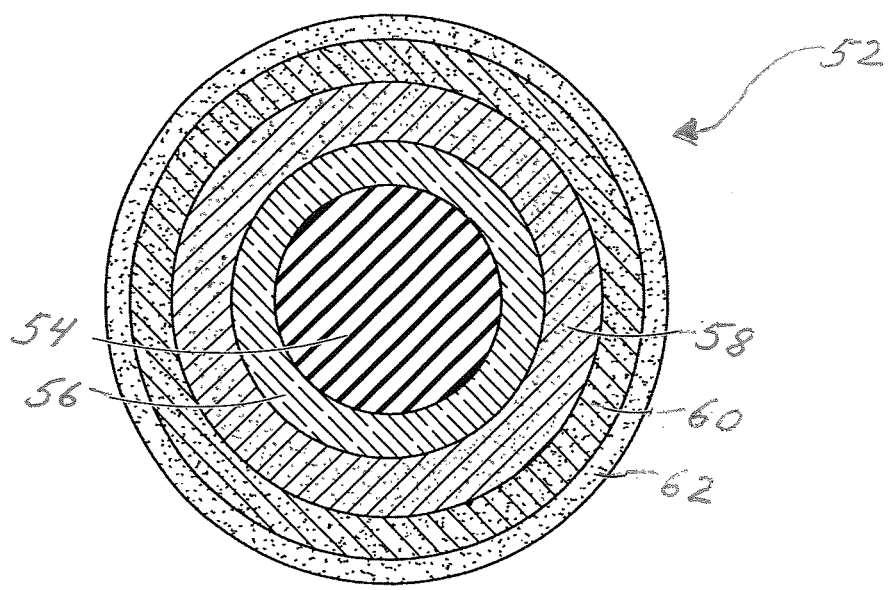
FIG. 3 is a cross-sectional view of five-piece golf ball according to an embodiment of the present invention.

FIG. 3 shows another five-piece golf ball 52 according to a third embodiment of the invention, wherein the ball includes an inner core layer 54 and an outer core layer 56. The ball further includes a three-layer cover including an inner cover layer 58; intermediate cover layer 60; and outer cover layer 62.

As shown in FIG. 1, in one version of the golf ball of this invention, the ball has a dual core (i.e., two-layer core) and a dual cover (i.e., two-layer cover). The dual core consists of an inner core layer and an outer core layer. The inner core layer has a diameter within a range having a lower limit of 0.750 or 1.000 or 1.100 or 1.200 inches and an upper limit of 1.300 or 1.350 or 1.400 or 1.425 or 1.450 or 1.475 or 1.500 inches. The outer core layer encloses the inner core layer such that the two-layer core has an overall diameter within a range having a lower limit of 1.400 or 1.500 or 1.510 or 1.520 or 1.525 inches and an upper limit of 1.540 or 1.550 or 1.555 or 1.560 or 1.590 inches. In a particular embodiment, the inner core layer has a diameter of 1.250 inches and the outer core layer encloses the inner core layer such that the two-layer core has an overall diameter of 1.530 inches or 1.550 inches.

As shown in FIG. 2, in a second version of the golf ball of this invention, the ball has a multi-layered core including an inner core, an intermediate core layer, and an outer core layer. The inner core (center) may have a diameter within a range having a lower limit of 0.100 or 0.125 or 0.250 inches and an upper limit of 0.375 or 0.500 or 0.750 or 1.00 or 1.30 inches. The intermediate core layer may have a thickness within a range having a lower limit of 0.050 or 0.100 or 0.150 or 0.200 inches and an upper limit of 0.300 or 0.350 or 0.400 or 0.500 inches. In a particular embodiment, the intermediate core layer and inner core, when combined, form a core sub-structure having an outer diameter within a range having a lower limit of 0.900, 1.000, 1.100, 1.200, or 1.300 inches, and an upper limit of 1.350, 1.400, 1.425, 1.450, 1.500, or 1.500 inches. The outer core layer encloses the center and intermediate core layer structure such that the multi-layer core has an overall diameter within a range having a lower limit of 1.40 or 1.45 or 1.50 or 1.55 inches and an upper limit of 1.58 or 1.60 or 1.62 or 1.66 inches.

Hardness of Core Layers and Core Layer Materials

The inner core layer has a center hardness ($H_{center}$), i.e., hardness of the geometric center of the core, as measured according to the procedure given below, of 45 Shore C or greater, or 50 Shore C or greater, or 55 Shore C or greater, or 60 Shore C or greater, or a center hardness ($H_{center}$) within a range having a lower limit of 40 or 45 or 50 or 55 or 60 Shore C and an upper limit of 65 or 70 or 75 or 80 Shore C. The inner core layer has an outer surface hardness ($H_{center\ surface}$) of 65 Shore C or greater, or 70 Shore C or greater, or 75 Shore C or greater, or 80 Shore C or greater, or an outer surface hardness within a range having a lower limit of 55 or 60 or 65 or 70 or 75 Shore C and an upper limit of 80 or 85 or 90 Shore C. In a particular embodiment, the Shore C hardness of the inner core layer's outer surface is greater than or equal to the Shore C hardness of the geometric center of the core. In another particular embodiment, the inner core layer has a positive hardness gradient wherein the Shore C hardness of the inner core layer's outer surface is at least 10 Shore C units greater, or at least 15 Shore C units greater, or at least 19 Shore C units greater than the Shore C hardness of the geometric center of the core.

The outer core layer has an outer surface hardness ($H_{outer\ core\ surface}$) of 70 Shore C or greater, or 75 Shore C or greater, or 80 Shore C or greater, or greater than 80 Shore C, or 85 Shore C or greater, or greater than 85 Shore C, or 87 Shore C or greater, or greater than 87 Shore C, or 89 Shore C or greater, or greater than 89 Shore C, or 90 Shore C or greater, or greater than 90 Shore C, or an outer surface hardness within a range having a lower limit of 70 or 72 or 75 or 80 or 85 or 90 Shore C and an upper limit of 95 Shore C. In a particular embodiment, the overall dual core has a positive hardness gradient wherein the Shore C hardness of the outer core layer's outer surface is at least 20 Shore C units greater, or at least 25 Shore C units greater, or at least 30 Shore C units greater than the Shore C hardness of the geometric center of the core. That is, in one embodiment, the difference between $H_{outer\ core\ surface}$ and $H_{center}$ is ≥20 Shore C units, and, in another embodiment, the difference between between $H_{outer\ core\ surface}$ and $H_{center}$ is ≥25 Shore C units. In another particular embodiment, the Shore C hardness of the outer core layer's outer surface is greater than the Shore C material hardness of the inner cover layer.

In general, the material hardness of the outer core is within a range having a lower limit of 70 or 75 or 80 or 83 or 85 Shore C and an upper limit of 87 or 89 or 90 or 91 or 93 or 95 Shore C.

If an intermediate core layer is present, the outer surface hardness of the intermediate core layer ($H_{intermediate\ core\ surface}$) is preferably 83 Shore C or greater, 85 Shore C or greater, or the outer surface hardness is within a range having a lower limit of 83, 86, 87, 89 or 91 Shore C and an upper limit of 90 or 91 or 95 or greater Shore C. As measured in Shore D, the outer surface hardness of the intermediate core layer ($H_{intermediate\ core\ surface}$) is preferably 50 Shore D or more and is preferably within a range having a lower limit of 50, 53, 55, 57, 60, 61, or 63 and an upper limit of 60, 62, 65, 67, 70, 72, or 75 Shore D. In a particular embodiment, $H_{intermediate\ core\ surface}$ is greater than $H_{outer\ core\ surface}$. For purposes of the present disclosure, the outer surface hardness of the intermediate core layer ($H_{intermediate\ core\ surface}$) is measured according to the procedure given herein for measuring the outer surface of a golf ball layer.

If an intermediate core layer is present, the intermediate core layer preferably has a material hardness ($H_{intermediate\ core\ material}$) of 98 Shore C or less, or 96 Shore C or less, or less than 96 Shore C, or 95 Shore C or less, or 93 Shore C or less, or has a material hardness ($H_{intermediate\ core\ material}$) within a range having a lower limit of 80 or 83 or 84 or 85 or 87 Shore C and an upper limit of 89 or 90 or 91 or 92 or 95 or 97 or 99 Shore C. Preferably, the material hardness of the intermediate core layer ($H_{intermediate\ core\ material}$) is at least 85 Shore C. In a particular embodiment, $H_{intermediate\ core\ material}$ is greater than $H_{outer\ core\ material}$.

Methods for Measuring Hardness

It should be understood that there is a fundamental difference between "material hardness" and "hardness as measured directly on a golf ball." For purposes of the present disclosure, material hardness is measured according to ASTM D2240 and generally involves measuring the hardness of a flat "slab" or "button" formed of the material. Hardness as measured directly on a golf ball (or other spherical surface) typically results in a different hardness value. This difference in hardness values is due to several factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other. Unless otherwise stated, the material hardness values given herein are measured according to ASTM D2240, with all values reported following 10 days of aging at 50% relative humidity and 23° C.

For purposes of the present disclosure, the center hardness of the inner core layer ($H_{center}$) is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within ±0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

For purposes of the present disclosure, the outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to insure that the golf ball or golf ball subassembly is centered under the durometer indentor before a surface hardness reading is obtained. A calibrated, digital durometer, capable of reading to 0.1 hardness units is used for all hardness measurements and is set to take hardness readings at 1 second after the maximum reading is obtained. The digital durometer must be attached to, and its foot made parallel to, the base of an automatic stand. The weight on the durometer and attack rate conform to ASTM D-2240.

For purposes of the present disclosure, a hardness gradient of a golf ball layer is defined by hardness measurements made at the outer surface of the layer and the inner surface of the layer. "Negative" and "positive" refer to the result of subtracting the hardness value at the innermost surface of the golf ball component from the hardness value at the outermost surface of the component. For example, if the outer surface of a solid core has a lower hardness value than the center (i.e., the surface is softer than the center), the hardness gradient will be deemed a "negative" gradient.

Thermoplastic layers of golf balls disclosed herein may be treated in such a manner as to create a positive or negative hardness gradient, as disclosed, for example, in U.S. patent application Ser. No. 11/939,632, filed Nov. 14, 2007; Ser. No. 11/939,634, filed Nov. 14, 2007; Ser. No. 11/939,635, filed Nov. 14, 2007; and Ser. No. 11/939,637 filed Nov. 14, 2007. The entire disclosure of each of these references is hereby incorporated herein by reference. In golf ball layers of the present invention wherein a thermosetting rubber is used, gradient-producing processes and/or gradient-producing rubber formulations may be employed, as disclosed, for example, in U.S. patent application Ser. No. 12/048,665, filed Mar. 14, 2008; Ser. No. 11/829,461, filed Jul. 27, 2007; Ser. No. 11/772,903, filed Jul. 3, 2007; Ser. No. 11/832,163, filed Aug. 1, 2007; and U.S. Pat. No. 7,410,429. The entire disclosure of each of these references is hereby incorporated herein by reference.

Inner Core Layer

In one embodiment, the inner core layer (center) is formed from a thermoset rubber composition. Suitable rubber compositions include natural and synthetic rubbers including, but not limited to, polybutadiene, polyisoprene, ethylene propylene rubber (EPR), styrene-butadiene rubber, styrenic block copolymer rubbers (such as SI, SIS, SB, SBS, SIBS, and the like, where S is styrene, I is isobutylene, and B is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and para-alkylstyrene, halogenated copolymers of isobutylene and para-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof. Diene rubbers are preferred, particularly polybutadiene, styrene-butadiene, and mixtures of polybutadiene with other elastomers wherein the amount of polybutadiene present is at least 40 wt % based on the total polymeric weight of the mixture. Suitable polybutadiene-based and styrene-butadiene-based rubber core compositions preferably comprise the base rubber, an initiator agent, and a coagent.

Suitable examples of commercially available polybutadienes include, but are not limited to, Buna CB neodymium catalyzed polybutadiene rubbers, such as Buna CB 23, and Taktene® cobalt catalyzed polybutadiene rubbers, such as Taktene® 220 and 221, commercially available from LANXESS® Corporation; SE BR-1220, commercially available from The Dow Chemical Company; Europrene® NEOCIS® BR 40 and BR 60, commercially available from Polimeri Europa®; UBEPOL-BR® rubbers, commercially available from UBE Industries, Inc.; BR 01, commercially available from Japan Synthetic Rubber Co., Ltd.; and Neodene neodymium catalyzed high cis polybutadiene rubbers, such as Neodene BR 40, commercially available from Karbochem.

The rubber composition may be cured using conventional curing techniques. Suitable curing methods include, for example, peroxide-curing, sulfur-curing, high-energy radiation, and combinations thereof. Suitable high energy radiation sources include, but are not limited to, electron beams, ultra-violet radiation, gamma radiation, X-ray radiation, infrared radiation, heat, and combinations thereof. Suitable organic peroxide initiator agents include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; benzoyl peroxide; and combinations thereof. In a particular embodiment, the initiator agent is dicumyl peroxide, including, but not limited to Perkadox® BC, commercially available from Akzo Nobel. Peroxide initiator agents are generally present in the rubber composition in an amount of at least 0.05 parts by weight per 100 parts of the base rubber, or an amount within the range having a lower limit of 0.05 parts or 0.1 parts or 1 part or 1.25 parts or 1.5 parts by weight per 100 parts of the base rubber, and an upper limit of 2.5 parts or 3 parts or 5 parts or 6 parts or 10 parts or 15 parts by weight per 100 parts of the base rubber.

The rubber composition may further include a reactive crosslinking coagent, commonly used with peroxides to increase the state of cure. Suitable coagents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, nickel, and sodium. In a particular embodiment, the coagent is selected from zinc salts of acrylates, diacrylates, methacrylates, dimethacrylates, and mixtures thereof. In another particular embodiment, the coagent is zinc diacrylate. When the coagent is zinc diacrylate and/or zinc dimethacrylate, the coagent is typically included in the rubber composition in an amount within the range having a lower limit of 1 or 5 or 10 or 15 or 19 or 20 parts by weight per 100 parts of the base rubber, and an upper limit of 24 or 25 or 30 or 35 or 40 or 45 or 50 or 60 parts by weight per 100 parts of the base rubber. When one or more less active coagents are used, such as zinc monomethacrylate and various liquid acrylates and methacrylates, the amount of less active coagent used may be the same as or higher than for zinc diacrylate and zinc dimethacrylate coagents. The desired compression may be obtained by adjusting the amount of crosslinking, which can be achieved, for example, by altering the type and amount of coagent.

The rubber composition optionally includes a curing agent. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof.

The rubber composition optionally contains one or more antioxidants. Antioxidants are compounds that can inhibit or prevent the oxidative degradation of the rubber. Some antioxidants also act as free radical scavengers; thus, when antioxidants are included in the rubber composition, the amount of initiator agent used may be as high or higher than the amounts disclosed herein. Suitable antioxidants include, for example, dihydroquinoline antioxidants, amine type antioxidants, and phenolic type antioxidants.

The rubber composition may contain one or more fillers to adjust the density and/or specific gravity of the core. Exemplary fillers include precipitated hydrated silica, clay, talc, asbestos, glass fibers, aramid fibers, mica, calcium metasilicate, zinc sulfate, barium sulfate, zinc sulfide, lithopone, silicates, silicon carbide, diatomaceous earth, polyvinyl chloride, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, magnesium oxide, and zirconium oxide), particulate carbonaceous materials (e.g., graphite, carbon black, cotton flock, natural bitumen, cellulose flock, and leather fiber), microballoons (e.g., glass and ceramic), fly ash, regrind (i.e., core material that is ground and recycled), nanofillers and combinations thereof. The amount of particulate material(s) present in the rubber composition is typically within a range having a lower limit of 5 parts or 10 parts by weight per 100 parts of the base rubber, and an upper limit of 30 parts or 50 parts or 100 parts by weight per 100 parts of the base rubber. Filler materials may be dual-functional fillers, such as zinc oxide (which may be used as a filler/acid scavenger) and titanium dioxide (which may be used as a filler/brightener material).

The rubber composition may also contain one or more additives selected from processing aids, processing oils, plasticizers, coloring agents, fluorescent agents, chemical blowing and foaming agents, defoaming agents, stabilizers, softening agents, impact modifiers, free radical scavengers, accelerators, scorch retarders, and the like. The amount of additive(s) typically present in the rubber composition is typically within a range having a lower limit of 0 parts by weight per 100 parts of the base rubber, and an upper limit of 20 parts or 50 parts or 100 parts or 150 parts by weight per 100 parts of the base rubber.

The rubber composition optionally includes a soft and fast agent. As used herein, "soft and fast agent" means any compound or a blend thereof that is capable of making a core 1) softer (have a lower compression) at a constant COR and/or 2) faster (have a higher COR) at equal compression, when compared to a core equivalently prepared without a soft and fast agent. Preferably, the rubber composition contains from 0.05 phr to 10.0 phr of a soft and fast agent. In one embodiment, the soft and fast agent is present in an amount within a range having a lower limit of 0.05 or 0.1 or 0.2 or 0.5 phr and an upper limit of 1.0 or 2.0 or 3.0 or 5.0 phr. In another embodiment, the soft and fast agent is present in an amount of from 2.0 phr to 5.0 phr, or from 2.35 phr to 4.0 phr, or from 2.35 phr to 3.0 phr. In an alternative high concentration embodiment, the soft and fast agent is present in an amount of from 5.0 phr to 10.0 phr, or from 6.0 phr to 9.0 phr, or from 7.0 phr to 8.0 phr. In another embodiment, the soft and fast agent is present in an amount of 2.6 phr.

Suitable soft and fast agents include, but are not limited to, organosulfur and metal-containing organosulfur compounds; organic sulfur compounds, including mono, di, and polysulfides, thiol, and mercapto compounds; inorganic sulfide compounds; blends of an organosulfur compound and an inorganic sulfide compound; Group VIA compounds; substituted and unsubstituted aromatic organic compounds that do not contain sulfur or metal; aromatic organometallic compounds; hydroquinones; benzoquinones; quinhydrones; catechols; resorcinols; and combinations thereof. As used herein, "organosulfur compound" refers to any compound containing carbon, hydrogen, and sulfur, where the sulfur is directly bonded to at least 1 carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

In a particular embodiment, the rubber composition includes an organosulfur compound selected from halogenated thiophenol compounds, and, more particularly, the halogenated thiophenol is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Even more particularly, the halogenated thiophenol is the zinc salt of pentachlorothiophenol, which is commercially available from eChinachem of San Francisco, Calif. Suitable organosulfur compounds are further disclosed, for example, in U.S. Pat. Nos. 6,635,716, 6,919,393, 7,005,479 and 7,148,279, the entire disclosures of which are hereby incorporated herein by reference.

When the rubber composition includes one or more hydroquinones, benzoquinones, quinhydrones, catechols, resorcinols, or a combination thereof, the total amount of hydroquinone(s), benzoquinone(s), quinhydrone(s), catechol(s), and/or resorcinol(s) present in the composition is typically at least 0.1 parts by weight or at least 0.15 parts by weight or at least 0.2 parts by weight per 100 parts of the base rubber, or an amount within the range having a lower limit of 0.1 parts or 0.15 parts or 0.25 parts or 0.3 parts or 0.375 parts by weight per 100 parts of the base rubber, and an upper limit of 0.5 parts or 1 part or 1.5 parts or 2 parts or 3 parts by weight per 100 parts of the base rubber.

In a particular embodiment, the rubber composition includes a soft and fast agent selected from zinc pentachlorothiophenol, pentachlorothiophenol, ditolyl disulfide, diphenyl disulfide, dixylyl disulfide, 2-nitroresorcinol, and combinations thereof.

Suitable types and amounts of base rubber, initiator agent, coagent, filler, and additives are more fully described in, for example, U.S. Pat. Nos. 6,566,483, 6,695,718, and 6,939,907, 7,041,721 and 7,138,460, the entire disclosures of which are hereby incorporated herein by reference.

In another embodiment, the inner core layer is formed from a thermoplastic composition. In a particular aspect of this embodiment, the inner core layer is formed from an ionomer composition. In another particular aspect of this embodiment, the inner core layer is formed from a non-ionomeric composition.

Suitable ionomer compositions include partially neutralized ionomers and highly neutralized ionomers, including ionomers formed from blends of two or more partially neutralized ionomers, blends of two or more highly neutralized ionomers, and blends of one or more partially neutralized ionomers with one or more highly neutralized ionomers. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. As used herein, "(meth) acrylic acid" means methacrylic acid and/or acrylic acid. Likewise, "(meth) acrylate" means methacrylate and/or acrylate. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Particularly preferred O/X/Y-type copolymers are ethylene/(meth) acrylic acid/n-butyl (meth) acrylate, ethylene/(meth) acrylic acid/isobutyl (meth) acrylate, ethylene/(meth) acrylic acid/methyl (meth) acrylate, and ethylene/(meth) acrylic acid/ethyl (meth) acrylate. The acid is typically present in the acid copolymer in an amount of 6 wt % or greater, or 9 wt % or greater, or 10 wt % or greater, or 11 wt % or greater, or 15 wt % or greater, or 16 wt % or greater, or 19 wt % or greater, or 20 wt % or greater, or in an amount within a range having a lower limit of 1 or 4 or 6 or 8 or 10 or 11 or 12 or 15 wt % and an upper limit of 15 or 16 or 17 or 19 or 20 or 20.5 or 21 or 25 or 30 or 35 or 40 wt %, based on the total weight of the acid copolymer. The acid copolymer is at least partially neutralized with a cation source, optionally in the presence of a high molecular weight organic acid, such as those disclosed in U.S. Pat. No. 6,756,436, the entire disclosure of which is hereby incorporated herein by reference. In a particular embodiment, less than 40% of the acid groups present in the composition are neutralized. In another particular embodiment, from 40% to 60% of the acid groups present in the composition are neutralized. In another particular embodiment, from 60% to 70% of the acid groups present in the composition are neutralized. In another particular embodiment, from 60% to 80% of the acid groups present in the composition are neutralized. In another particular embodiment, from 70% to 80% of the acid groups present in the composition are neutralized. In another embodiment, from 80% to 100% of the acid groups present in the composition are neutralized.

Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of lithium, sodium, potassium, magnesium, cesium, calcium, barium, lead, tin, zinc, aluminum, manganese, nickel, chromium, copper, or a combination thereof.

In a particular embodiment, the ionomer composition includes a bimodal ionomer, for example, DuPont® AD1043 ionomers, and the ionomers disclosed in U.S. Patent Application Publication No. 2004/0220343 and U.S. Pat. Nos. 6,562,906, 6,762,246 and 7,273,903, the entire disclosures of which are hereby incorporated herein by reference.

Suitable ionomer compositions include blends of partially- or fully-neutralized ionomers with additional thermoplastic and thermoset materials, including, but not limited to, non-ionomeric acid copolymers, engineering thermoplastics, fatty acid/salt-based highly neutralized polymers, polybutadienes, polyurethanes, polyureas, polyesters, polyamides, polycarbonate/polyester blends, thermoplastic elastomers, maleic anhydride-grafted metallocene-catalyzed polymers (e.g., maleic anhydride-grafted metallocene-catalyzed polyethylene), and other conventional polymeric materials.

Also suitable are polyester ionomers, including, but not limited to, those disclosed, for example, in U.S. Pat. Nos. 6,476,157 and 7,074,465, the entire disclosures of which are hereby incorporated herein by reference.

Also suitable are compositions comprising a silicone ionomer. Suitable thermoplastic silicone ionomer compositions include a silicone ionomer optionally blended with one or more additional polymer components selected from E/X/Y-type ionomers of ethylene (E), an α,β-unsaturated carboxylic acid (X), and optionally a softening comonomer (Y); thermoplastic polyurethanes; polyesters; and polyamides. Suitable thermoset silicone ionomer compositions include a silicone ionomer optionally blended with one or more additional polymer components selected from thermosetting polyurethanes and diene rubbers, particularly polybutadienes.

Silicone ionomers are further disclosed, for example, in U.S. Pat. No. 8,329,156 to Horstman et al.; U.S. Pat. No. 8,835,583 to Saxena et al.; and Batra, Ashish, Claude Cohen, and T. M. Duncan. "Synthesis and Rheology of Tailored Poly(dimethylsiloxane) Zinc and Sodium Ionomers." *Macromolecules* (2005): 426-38. American Chemical Society. Web. 1 Oct. 2014; the entire disclosures of which are hereby incorporated herein by reference.

Suitable ionomer compositions are further disclosed, for example, in U.S. Patent Application Publication Nos. 2005/0049367, 2005/0148725, 2005/0020741, 2004/0220343, and 2003/0130434, and U.S. Pat. Nos. 5,587,430, 5,691,418, 5,866,658, 6,100,321, 6,562,906, 6,653,382, 6,756,436, 6,777,472, 6,762,246, 6,815,480, 6,894,098, 6,919,393, 6,953,820, 6,994,638, 7,375,151, and 7,652,086, the entire disclosures of which are hereby incorporated herein by reference.

Suitable non-ionomeric thermoplastic compositions include the following, including homopolymers and copolymers thereof, as well as their derivatives that are compatibilized with at least one grafted or copolymerized functional group, such as maleic anhydride, amine, epoxy, isocyanate, hydroxyl, sulfonate, phosphonate, and the like:

(a) non-ionomeric acid copolymers, particularly O/X- and O/X/Y-type acid copolymers of an α-olefin (O), preferably selected from ethylene and propylene; a $C_3$-$C_8$ α,β-ethylenically unsaturated carboxylic acid (X), preferably selected from acrylic, methacrylic, ethacrylic, crotonic, maleic, fumaric, and itaconic acid; and an optional softening monomer (Y) preferably selected from vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons;

(b) polyesters, particularly those modified with a compatibilizing group such as sulfonate or phosphonate, including poly(ethylene terephthalate), poly(butylene terephthalate), polypropylene terephthalate), poly(trimethylene terephthalate), poly(ethylene naphthenate), and derivatives thereof, including, but not limited to, those disclosed in U.S. Pat. Nos. 6,353,050, 6,274,298, and 6,001,930, the entire disclosures of which are hereby incorporated herein by reference;

(c) polyamides, polyamide-ethers, and polyamide-esters, including, but not limited to, those disclosed in U.S. Pat. Nos. 6,187,864, 6,001,930, and 5,981,654, the entire disclosures of which are hereby incorporated herein by reference;

(d) polyimides, polyetherketones, and polyamideimides;

(e) polyurethanes, polyureas, and copolymers and blends thereof, including, but not limited to, those disclosed in U.S. Pat. Nos. 5,334,673, 5,484,870, 6,506,851, 6,756,436, 6,835,794, 6,867,279, 6,960,630, and 7,105,623, U.S. Patent Application Publication Nos. 2014/0073458 and 2007/0117923, and U.S. Patent Application Ser. No. 60/401,047, filed Aug. 6, 2002, the entire disclosures of which are hereby incorporated herein by reference;

(f) polystyrenes, such as poly(styrene-co-maleic anhydride), acrylonitrile-butadiene-styrene, poly(styrene sulfonate), polyethylene styrene;

(g) polypropylenes, polyethylenes, and copolymers of propylene and ethylene;

(h) ethylene elastomers;

(i) propylene elastomers;

(j) styrenic copolymers and styrenic block copolymers;

(k) dynamically vulcanized elastomers;

(l) polyvinyl chlorides;

(l) polyvinyl acetates, particularly those having less than about 9% of vinyl acetate by weight;

(m) polycarbonates, polycarbonate/acrylonitrile-butadiene-styrene blends, polycarbonate/polyurethane blends, and polycarbonate/polyester blends;

(n) polyvinyl alcohols;

(o) polyethers and polyether-esters;

(p) engineering thermoplastic vulcanizates, such as those disclosed, for example, in U.S. Patent Application Publication No. 2008/0132359, the entire disclosure of which is hereby incorporated herein by reference;

(q) metallocene-catalyzed polymers, such as those disclosed in U.S. Pat. Nos. 6,274,669, 5,919,862, 5,981,654, and 5,703,166, the entire disclosures of which are hereby incorporated herein by reference;

(r) fluoropolymers, such as those disclosed in U.S. Pat. Nos. 5,691,066, 6,747,110, and 7,009,002, the entire disclosures of which are hereby incorporated herein by reference; and (s) combinations of two or more thereof.

In a particular embodiment, the inner core layer is formed from a blend of at least two different polymers. In a particular aspect of this embodiment, at least one polymer is an ionomer.

In another particular embodiment, the inner core layer is formed from a blend of at least a first and a second ionomer.

In another particular embodiment, the inner core layer is formed from a blend of one or more ionomers and one or more additional polymers selected from non-ionomeric acid copolymers, polyesters, polyamides, polyurethanes, polystyrenes, and functionalized derivatives thereof.

In another particular embodiment, the inner core layer is formed from a blend of at least a functionalized polyethylene and a functionalized polymer selected from polyethylenes, including metallocene-catalyzed and non-metallocene-catalyzed polyethylenes, ethylene vinyl acetates, ethylene acid copolymers, ethylene acrylate copolymers, ethylene elastomers, and polypropylenes. In a particular aspect of this embodiment, the functionalized polyethylene is a maleic anhydride-grafted polymer selected from ethylene homopolymers, ethylene-hexene copolymers, ethylene-octene copolymers, and ethylene-butene copolymers.

In another particular embodiment, the inner core layer is formed from a blend of at least an ionomer and a functionalized polymer selected from polyethylenes, including metallocene-catalyzed and non-metallocene-catalyzed polyethylenes, ethylene vinyl acetates, ethylene acid copolymers, ethylene elastomers, and polypropylenes. In a particular aspect of this embodiment, the functionalized polymer is a polyethylene selected from ethylene homopolymers, ethylene-hexene copolymers, ethylene-octene copolymers, and ethylene-butene copolymers.

In another particular embodiment, the inner core layer is formed from a blend of at least an ionomer and a non-ionomeric acid copolymer.

In another particular embodiment, the inner core layer is formed from a blend of at least an ionomer and a styrenic block copolymer or functionalized derivative thereof.

In another particular embodiment, the inner core layer is formed from a blend of at least an ionomer and an ethylene acrylate based polymer or functionalized derivative thereof.

In another particular embodiment, the inner core layer is formed from a blend of at least an ionomer and a polyoctenamer or a functionalized derivative thereof.

In another particular embodiment, the inner core layer is formed from a blend including at least an ionomer and a thermoplastic polyurethane. In a particular aspect of this embodiment, the polyurethane is selected from the polyurethanes disclosed in U.S. Patent Application Publication No. 2005/0256294, the entire disclosure of which is hereby incorporated herein by reference.

In another particular embodiment, the inner core layer is formed from a blend including:

(a) a first component selected from polyester elastomers (e.g., Hytrel® polyester elastomers, commercially available from E. I. du Pont de Nemours and Company, and Riteflex® polyester elastomers, commercially available from Ticona); polyether block amides (e.g., Pebax® polyether and polyester amides); polyester-ether amides; and polypropylene ether glycol compositions, such as those disclosed, e.g., in U.S. Patent Application Publication No. 2005/0256294, the entire disclosure of which is hereby incorporated herein by reference; and combinations of two or more thereof;

(b) a second component selected from O/X/Y-type and O/X-type ionomers, including partially and highly-neutralized ionomers, particularly highly neutralized ionomers comprising fatty acid salts, such as DuPont® HPF 1000 and HPF 2000 highly neutralized ionomers, and VLMI-type ionomers, such as Surlyn® 9320 ionomer; O/X/Y-type acid copolymers; polyamides and polyamide blends, particularly selected from the polyamides and polyamide blends disclosed above; and silicone ionomers.

In a particular aspect of this embodiment, the inner core layer is formed from a blend including at least a polyester elastomer and a highly neutralized ionomer comprising fatty acid salts. Such blend is disclosed, for example, in U.S. Pat. No. 7,375,151, the entire disclosure of which is hereby incorporated herein by reference.

In another particular embodiment, the inner core layer is formed from a composition selected from the relatively soft HNP compositions disclosed in U.S. Pat. No. 7,468,006, the entire disclosure of which is hereby incorporated herein by reference, and the low modulus HNP compositions disclosed in U.S. Pat. No. 7,207,903, the entire disclosure of which is hereby incorporated herein by reference.

In another particular embodiment, the inner core layer is formed from a composition selected from the relatively hard HNP compositions disclosed in U.S. Pat. No. 7,468,006, the entire disclosure of which is hereby incorporated herein by reference, and the high modulus HNP compositions disclosed in U.S. Pat. No. 7,207,903, the entire disclosure of which is hereby incorporated herein by reference.

In another particular embodiment, the inner core layer is formed from an ionomer composition which is formed by blending an acid polymer, a non-acid polymer, a cation source, and a fatty acid or metal salt thereof. In a particular aspect of this embodiment, the acid polymer is selected from ethylene-acrylic acid and ethylene-methacrylic acid copolymers, optionally containing a softening monomer selected from n-butyl acrylate and iso-butyl acrylate. In another particular aspect of this embodiment, the non-acid polymer is an elastomeric polymer selected from ethylene-alkyl acrylate polymers, particularly polyethylene-butyl acrylate, polyethylene-methyl acrylate, and polyethylene-ethyl acrylate; metallocene-catalyzed polymers; ethylene-butyl acrylate-carbon monoxide polymers and ethylene-vinyl acetate-carbon monoxide polymers; polyethylene-vinyl acetates; ethylene-alkyl acrylate polymers containing a cure site monomer; ethylene-propylene rubbers and ethylene-propylene-diene monomer rubbers; olefinic ethylene elastomers, particularly ethylene-octene polymers, ethylene-butene polymers, ethylene-propylene polymers, and ethylene-hexene polymers; styrenic block copolymers; polyester elastomers; polyamide elastomers; polyolefin rubbers, particularly polybutadiene, polyisoprene, and styrene-butadiene rubber; and thermoplastic polyurethanes. The acid polymer and non-acid polymer are combined and reacted with a cation source, such that at least 80% of all acid groups present are neutralized. Ionomer compositions formed by blending an acid polymer, a non-acid polymer, a cation source, and a fatty acid or metal salt thereof are further disclosed, for example, in U.S. Patent Application Publication No. 2014/0113748, the entire disclosure of which is hereby incorporated herein by reference.

In another particular embodiment, the inner core layer is formed from a plasticized acid copolymer composition, a plasticized partially neutralized acid copolymer composition, or a plasticized HNP composition, wherein the composition comprises at least 0.5 wt %, based on the total weight of the composition, of a plasticizer. Suitable plasticized acid copolymer compositions, plasticized partially neutralized acid copolymer compositions, and plasticized HNP compositions are further disclosed, for example, in U.S. Patent Application Publication No. 2015/0151166, U.S. Patent Application Publication No. 2015/0111668, U.S. Patent Application Publication No. 2015/0031475, U.S. Patent Application Publication No. 2015/0005108, U.S. Patent Application Publication No. 2015/0141167, and U.S. Patent Application Publication No. 2015/0151165, the entire disclosures of which are hereby incorporated herein by reference. In another particular embodiment, the inner core layer is formed from a plasticized composition comprising a non-acid polymer and at least 1 wt % of a plasticizer. Suitable thermoplastic non-acid polymer/plasticizer compositions are further disclosed, for example, in U.S. patent application Ser. No. 14/755,936, filed Jun. 30, 2015, the entire disclosure of which is hereby incorporated herein by reference.

In another particular embodiment, the inner core layer is formed from a plasticized polyester composition, such as those disclosed, for example, in U.S. patent application Ser. No. 14/532,141, filed Nov. 4, 2104, the entire disclosure of which is hereby incorporated herein by reference.

In another particular embodiment, the inner core layer is formed from a plasticized polyamide composition, such as those disclosed, for example, in U.S. Patent Application Publication Nos. 2014/0302947, 2014/0323243, 2015/0057105, and 2015/0133238, the entire disclosures of which are hereby incorporated herein by reference.

In another particular embodiment, the inner core layer is formed from a transparent polyamide/plasticizer composition, such as those disclosed, for example, in U.S. Patent Application Publication No. 2015/0182807, the entire disclosure of which is hereby incorporated herein by reference.

In another particular embodiment, the inner core layer is formed from a polyamide/fatty acid amide composition, as disclosed, for example, in U.S. Pat. No. 8,987,360, the entire disclosure of which is hereby incorporated herein by reference.

In another particular embodiment, the inner core layer is formed from a polyamide composition comprising a blend of polyamide, ethylene acid copolymer ionomer, fatty acid amide, and plasticizer, as disclosed, for example, in U.S. Patent Application Publication No. 2015/0190680, the entire disclosure of which is hereby incorporated herein by reference.

In another particular embodiment, the inner core layer is formed from a plasticized polyurethane composition, such as those disclosed, for example, in U.S. patent application Ser. No. 14/672,538, filed Mar. 30, 2015; U.S. patent application Ser. No. 14/672,523, filed Mar. 30, 2015; U.S. patent application Ser. No. 14/672,485, filed Mar. 30, 2015; and U.S. patent application Ser. No. 14/691,720, filed Apr. 21, 2015, the entire disclosures of which are hereby incorporated herein by reference.

The thermoplastic inner core layer composition optionally includes additive(s) and/or filler(s) in an amount of 50 wt % or less, or 30 wt % or less, or 20 wt % or less, or 15 wt % or less, based on the total weight of the inner core layer composition. Suitable additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, $TiO_2$, acid copolymer wax, surfactants, performance additives (e.g., A-C® performance additives, particularly A-C® low molecular weight ionomers and copolymers, A-C® oxidized polyethylenes, A-C® ethylene vinyl acetate waxes, and AClyn® low molecular weight ionomers, commercially available from Honeywell International Inc.), fatty acid amides (e.g., ethylene bis-stearamide and ethylene bis-oleamide), fatty acids and salts thereof (e.g., stearic acid, oleic acid, zinc stearate, magnesium stearate, zinc oleate, and magnesium oleate), oxides (e.g., zinc oxide, tin oxide, iron oxide, calcium oxide, aluminum oxide, titanium dioxide, magnesium oxide, and zirconium oxide), carbonates (e.g., calcium carbonate, zinc carbonate, barium carbonate, and magnesium carbonate), barium sulfate, zinc sulfate, tungsten, tungsten carbide, silica, lead silicate, clay, mica, talc, nano-fillers, carbon black, glass flake, milled glass, flock, fibers, and mixtures thereof. Suitable additives and fillers are more fully described in, for example, U.S. Patent Application Publication No. 2003/0225197, the entire disclosure of which is hereby incorporated herein by reference. In a particular embodiment, the total amount of additive(s) and filler(s) present in the inner core layer composition is 20 wt % or less, or 15 wt % or less, or 12 wt % or less, or 10 wt % or less, or 9 wt % or less, or 6 wt % or less, or 5 wt % or less, or 4 wt % or less, or 3 wt % or less, or within a range having a lower limit of 0 or 2 or 3 or 5 wt %, based on the total weight of the inner core layer composition, and an upper limit of 9 or 10 or 12 or 15 or 20 wt %, based on the total weight of the inner core layer composition. In a particular aspect of this embodiment, the inner core layer composition includes filler(s) selected from carbon black, micro- and nano-scale clays and organoclays, including (e.g., Cloisite® and Nanofil® nanoclays, commercially available from Southern Clay Products, Inc.; Nanomax® and Nanomer® nanoclays, commercially available from Nanocor, Inc., and Perkalite® nanoclays, commercially available from Akzo Nobel Polymer Chemicals), micro- and nano-scale talcs (e.g., Luzenac HAR® high aspect ratio talcs, commercially available from Luzenac America, Inc.), glass (e.g., glass flake, milled glass, microglass, and glass fibers), micro- and nano-scale mica and mica-based pigments (e.g., Iriodin® pearl luster pigments, commercially available from The Merck Group), and combinations thereof. Particularly suitable combinations of fillers include, but are not limited to, micro-scale filler(s) combined with nano-scale filler(s), and organic filler(s) with inorganic filler(s).

The thermoplastic inner core layer composition optionally includes one or more melt flow modifiers. Suitable melt flow modifiers include materials which increase the melt flow of the composition, as measured using ASTM D-1238, condition E, at 190° C., using a 2160 gram weight. Examples of suitable melt flow modifiers include, but are not limited to, fatty acids and fatty acid salts, including, but not limited to, those disclosed in U.S. Pat. No. 5,306,760, the entire disclosure of which is hereby incorporated herein by reference; fatty amides; polyhydric alcohols, including, but not limited to, those disclosed in U.S. Pat. No. 7,365,128, and U.S. Patent Application Publication No. 2010/0099514, the entire disclosures of which are hereby incorporated herein by reference; polylactic acids, including, but not limited to, those disclosed in U.S. Pat. No. 7,642,319, the entire disclosure of which is hereby incorporated herein by reference; and the modifiers disclosed in U.S. Patent Application Publication No. 2010/0099514 and 2009/0203469, the entire disclosures of which are hereby incorporated herein by reference. Flow enhancing additives also include, but are not limited to, montanic acids, esters of montanic acids and salts thereof, bis-stearoylethylenediamine, mono- and polyalcohol esters such as pentaerythritol tetrastearate, zwitterionic compounds, and metallocene-catalyzed polyethylene and polypropylene wax, including maleic anhydride modified versions thereof, amide waxes and alkylene diamides such as bisstearamides. Particularly suitable fatty amides include, but are not limited to, saturated fatty acid monoamides (e.g., lauramide, palmitamide, arachidamide behenamide, stearamide, and 12-hydroxy stearamide); unsaturated fatty acid monoamides (e.g., oleamide, erucamide, and ricinoleamide); N-substituted fatty acid amides (e.g., N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl erucamide, and erucyl stearamide, N-oleyl palmitamide, methylol amide (more preferably, methylol stearamide, methylol behenamide); saturated fatty acid bis-amides (e.g., methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, and N,N'-distearyl sebacamide); unsaturated fatty acid bis-amides (e.g., ethylene bis-oleamide, hexamethylene bis-oleamide, N,N'-dioleyl adipamide, N,N'-dioleyl sebacamide); and saturated and unsaturated fatty acid tetra amides, stearyl erucamide, ethylene bis stearamide and ethylene bis oleamide. Suitable examples of commercially available fatty amides include, but are not limited to, Kemamide® fatty acids, such as Kemamide® B (behenamide/arachidamide), Kemamide® W40 (N,N'-ethylenebisstearamide), Kemamide® P181 (oleyl palmitamide), Kemamide® S (stearamide), Kemamide® U (oleamide), Kemamide® E (erucamide), Kemamide® O (oleamide), Kemamide® W45 (N,N'-ethylenebisstearamide), Kenamide® W20 (N,N'-ethylenebisoleamide), Kemamide® E180 (stearyl erucamide), Kemamide® E221 (erucyl erucamide), Kemamide® S180 (stearyl stearamide), Kemamide® 5221 (erucyl stearamide), commercially available from Chemtura Corporation; and Crodamide® fatty amides, such as Crodamide® OR (oleamide), Crodamide® ER (erucamide), Crodamide® SR (stereamide), Crodamide® BR (behenamide), Crodamide® 203 (oleyl palmitamide), and Crodamide® 212 (stearyl erucamide), commercially available from Croda Universal Ltd.

Non-limiting examples of suitable commercially available thermoplastics for use in forming the inner core layer are Surlyn® ionomers, DuPont® HPF 1000, HPF 2000, HPF AD1035, HPF AD1040, and AD1043 ionomers, commercially available from E. I. du Pont de Nemours and Company; Clarix® ionomers, commercially available from A. Schulman, Inc.; Iotek® ionomers, commercially available from ExxonMobil Chemical Company; AClyn® ionomers, commercially available from Honeywell International Inc.; Amplify® IO ionomers, commercially available from The Dow Chemical Company; Amplify® GR functional polymers and Amplify® TY functional polymers, commercially available from The Dow Chemical Company; Fusabond® functionalized polymers, including ethylene vinyl acetates, polyethylenes, metallocene-catalyzed polyethylenes, ethylene propylene rubbers, and polypropylenes, commercially available from E. I. du Pont de Nemours and Company; Exxelor® maleic anhydride grafted polymers, including high density polyethylene, polypropylene, semi-crystalline ethylene copolymer, amorphous ethylene copolymer, commercially available from ExxonMobil Chemical Company; ExxonMobil® PP series polypropylene impact copolymers, such as PP7032E3, PP7032KN, PP7033E3, PP7684KN, commercially available from ExxonMobil Chemical Company; Vistamaxx® propylene-based elastomers, commercially available from ExxonMobil Chemical Company; Exact® plastomers, commercially available from ExxonMobil Chemical Company; Santoprene® thermoplastic vulcanized elastomers, commercially available from ExxonMobil Chemical Company; Nucrel® acid copolymers, commercially available from E. I. du Pont de Nemours and Company; Escor® acid copolymers, commercially available from ExxonMobil Chemical Company; Primacor® acid copolymers, commercially available from The Dow Chemical Company; Kraton® styrenic block copolymers, commercially available from Kraton Performance Polymers Inc.; Septon® styrenic block copolymers, commercially available from Kuraray Co., Ltd.; Lotader® ethylene acrylate based polymers, commercially available from Arkema Corporation; Polybond® grafted polyethylenes and polypropylenes, commercially available from Chemtura Corporation; Vestenamer® polyoctenamer, commercially available from Evonik Industries; Pebax® polyether and polyester amides, commercially available from Arkema Inc.; Hytrel® polyester elastomers, commercially available from E. I. du Pont de Nemours and Company; Riteflex® polyester elastomers, commercially available from Ticona; Estane® thermoplastic polyurethanes, commercially available from The Lubrizol Corporation; Grivory® polyamides and Grilamid® polyamides, commercially available from EMS Grivory; Zytel® polyamide resins and Elvamide® nylon multipolymer resins, commercially available from E. I. du Pont de Nemours and Company; Elvaloy® acrylate copolymer resins, commercially available from E. I. du Pont de Nemours and Company; Xylex® polycarbonate/polyester blends, commercially available from SABIC Innovative Plastics; and Elastollan® polyurethane-based thermoplastic elastomers, commercially available from BASF.

Intermediate Core Layer

The intermediate core layer is formed of a thermosetting or thermoplastic composition and preferably has a thickness of about 0.010 to 0.150 inches, preferably about 0.015 to 0.070, more preferably about 0.025 to 0.050, said thickness having a lower limit of about 0.015, 0.020, 0.030 or 0.040 and an upper limit of about 0.125 or 0.100, or 0.080 or 0.060 inches. The composition of the layer may be a thermosetting diene rubber composition, preferably comprising polybutadiene and having a formulation similar to that of the center as discussed above, or it may comprise a thermoplastic material such as an ionomer, polyester, polyamide, polyamide-ester or polyether-ester. In one preferred embodiment, the composition comprises a polyethylene-(meth) acrylic acid copolymer that is partially neutralized (less than 80% neutralization) with a cation source. Suitable thermoplastic materials that can be used to form the intermediate core include any of those thermoplastic materials described herein as being suitable cover materials, including ionomer resins and blends thereof (e.g., Surlyn® ionomers sold by DuPont; Iotek® ionomers sold by ExxonMobil Chemical; Amplify® ionomers sold by the Dow Chemical Co; and Clarix® ionomer resins sold by A. Schulman, Inc.). Also suitable for forming the intermediate core layer are the inner core layer compositions described above.

For example, compositions comprising an ionomer or a blend of two or more ionomers are particularly suitable for forming the intermediate core layer. Preferred ionomeric compositions include: (a) a composition comprising a "high acid ionomer" (i.e., having an acid content of greater than 16 wt %), such as Surlyn® 8150, a copolymer of ethylene and methacrylic acid, having an acid content of 19 wt %, which is 45% neutralized with sodium; (b) a composition comprising a high acid ionomer and a maleic anhydride-grafted non-ionomeric polymer (e.g., Fusabond® maleic anhydride-grafted metallocene-catalyzed ethylene-butene copolymers). A particularly preferred blend of high acid ionomer and maleic anhydride-grafted polymer is a blend of 79-85 wt % Surlyn® 8150 and 15-21 wt % Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference; (c) a composition comprising a 50/45/5 blend of Surlyn® 8940/Surlyn®. 9650/Nucrel® 960, preferably having a material hardness of from 80 to 85 Shore C; (d) a composition comprising a 50/25/25 blend of Surlyn® 8940/Surlyn® 9650/Surlyn® 9910, preferably having a material hardness of about 90 Shore C; (e) a composition comprising a 50/50 blend of Surlyn® 8940/Surlyn® 9650, preferably having a material hardness of about 86 Shore C; (f) a composition comprising a blend of Surlyn® 7940/Surlyn® 8940, optionally including a melt flow modifier; (g) a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9150), optionally including one or more melt flow modifiers such as an ionomer, ethylene-acid copolymer or ester terpolymer; and (h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8140, 40-50 wt % Surlyn® 9120, and 0-10 wt % Surlyn® 6320).

Surlyn® 8150, Surlyn®8940, and Surlyn®8140 are different grades of E/MAA copolymer in which the acid groups have been partially neutralized with sodium ions. Surlyn® 9650, Surlyn®9910, Surlyn®9150, and Surlyn®9120 are different grades of E/MAA copolymer in which the acid groups have been partially neutralized with zinc ions. Surlyn®7940 is an E/MAA copolymer in which the acid groups have been partially neutralized with lithium ions. Surlyn®6320 is a very low modulus magnesium ionomer with a medium acid content. Nucrel® 960 is an E/MAA copolymer resin nominally made with 15 wt % methacrylic acid. Surlyn® ionomers, Fusabond® copolymers, and Nucrel® copolymers are commercially available from E. I. du Pont de Nemours and Company.

As discussed above, the intermediate core layer may be formed of a thermosetting or thermoplastic composition including, but not limited to, natural rubbers, balata, guttapercha, cis-polybutadienes, trans-polybutadienes, synthetic polyisoprene rubbers, polyoctenamers, styrene-propylene-diene rubbers, metallocene rubbers, styrene-butadiene rubbers, ethylene-propylene rubbers, chloroprene rubbers, acrylonitrile rubbers, acrylonitrile-butadiene rubbers, styrene-ethylene block copolymers, maleic anhydride or succinate modified metallocene catalyzed ethylene copolymers, polypropylene resins, ionomer resins, polyamides, polyesters, polyurethanes, polyureas, chlorinated polyethylenes, polysulfide rubbers, fluorocarbons, and combinations thereof.

Outer Core Layer

Suitable thermoplastic materials that can be used to form the outer core include, but are not limited to, any of those thermoplastic materials described herein as being suitable inner core layer, intermediate core layer, or cover materials, including ionomer resins and blends thereof (e.g., Surlyn® ionomers sold by DuPont; Iotek® ionomers sold by ExxonMobil Chemical; Amplify® ionomers sold by the Dow Chemical Co; and Clarix® ionomer resins sold by A. Schulman, Inc.). The outer core is preferably formed from a highly resilient thermoplastic polymer such as a highly neutralized polymer composition. HNP compositions suitable for use in forming the outer core layer of golf balls of the present invention preferably have a material hardness of 35 Shore D or greater, and more preferably have a hardness of 45 Shore D or greater, or a hardness within a range having a lower limit of 45 or 50 or 55 or 57 or 58 or 60 or 65 or 70 or 75 Shore D and an upper limit of 80 or 85 or 90 or 95 Shore D.

Suitable HNP compositions for use in forming the outer core layer comprise an HNP and optionally melt flow modifier(s), additive(s), and/or filler(s). Suitable HNPs are salts of acid copolymers. It is understood that the HNP may be a blend of two or more HNPs. Preferred acid copolymers are copolymers of an α-olefin and a $C_3$-$C_8$ α,β-ethylenically unsaturated carboxylic acid. The acid is typically present in the acid copolymer in an amount within a range having a lower limit of 1 or 10 or 12 or 15 or 20 wt % and an upper limit of 25 or 30 or 35 or 40 wt %, based on the total weight of the acid copolymer. The α-olefin is preferably selected from ethylene and propylene. The acid is preferably selected from (meth) acrylic acid, ethacrylic acid, maleic acid, crotonic acid, fumaric acid, and itaconic acid. (Meth) acrylic acid is particularly preferred. Suitable acid copolymers include partially neutralized acid polymers. Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from ExxonMobil Chemical Company. Also suitable are DuPont® HPF 1000 and DuPont® HPF 2000, ionomeric materials commercially available from E. I. du Pont de Nemours and Company.

Suitable ethylene acid copolymers include, without limitation, ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

When a softening monomer is included, such copolymers are referred to herein as E/X/Y-type copolymers, wherein E is ethylene; X is a $C_3$ to $C_8$ α, β-ethylenically unsaturated mono- or dicarboxylic acid; and Y is a softening monomer. The softening monomer is typically an alkyl (meth) acrylate, wherein the alkyl groups have from 1 to 8 carbon atoms. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

"Low acid" and "high acid" ionomeric polymers, as well as blends of such ionomers, may be used. In general, low acid ionomers are considered to be those containing 16 wt % or less of acid moieties, whereas high acid ionomers are considered to be those containing greater than 16 wt % of acid moieties.

The HNP is formed by reacting the acid copolymer with a sufficient amount of cation source such that at least 80%, preferably at least 90%, more preferably at least 95%, and even more preferably 100%, of all acid groups present are neutralized. Suitable cation sources include metal ions and compounds of alkali metals, alkaline earth metals, and transition metals; metal ions and compounds of rare earth elements; silicone, silane, and silicate derivatives and complex ligands; and combinations thereof. Preferred cation sources are metal ions and compounds of magnesium, sodium, potassium, cesium, calcium, barium, manganese, copper, zinc, tin, lithium, and rare earth metals. Metal ions and compounds of calcium and magnesium are particularly preferred. The acid copolymer may be at least partially neutralized prior to contacting the acid copolymer with the cation source to form the HNP. Methods of preparing ionomers, and the acid copolymers on which ionomers are based, are disclosed, for example, in U.S. Pat. Nos. 3,264,272, and 4,351,931, and U.S. Patent Application Publication No. 2002/0013413.

In a preferred embodiment, the acid polymer of the HNP outer core layer composition has a modulus within a range having a lower limit of 25,000 or 27,000 or 30,000 or 40,000 or 45,000 or 50,000 or 55,000 or 60,000 psi and an upper limit of 72,000 or 75,000 or 100,000 or 150,000 psi. As used herein, "modulus" refers to flexural modulus as measured using a standard flex bar according to ASTM D790-B. Additional suitable acid polymers are more fully described, for example, in U.S. Pat. Nos. 6,562,906, 6,762,246, and 6,953,820 and U.S. Patent Application Publication Nos. 2005/0049367, 2005/0020741, and 2004/0220343, the entire disclosures of which are hereby incorporated herein by reference.

HNP outer core layer compositions of the present invention optionally contain one or more melt flow modifiers. The amount of melt flow modifier in the composition is readily determined such that the melt flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

Suitable melt flow modifiers include, but are not limited to, high molecular weight organic acids and salts thereof, polyamides, polyesters, polyacrylates, polyurethanes, polyethers, polyureas, polyhydric alcohols, and combinations thereof. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof. Suitable organic acids are more fully described, for example, in U.S. Pat. No. 6,756,436, the entire disclosure of which is hereby incorporated herein by reference.

Additional melt flow modifiers suitable for use in compositions of the present invention, include the non-fatty acid melt flow modifiers described in U.S. Pat. Nos. 7,365,128 and 7,402,629, the entire disclosures of which are hereby incorporated herein by reference.

HNP outer core layer compositions of the present invention optionally include additive(s) and/or filler(s) in an amount within a range having a lower limit of 0 or 5 or 10 wt %, and an upper limit of 25 or 30 or 50 wt %, based on the total weight of the composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof. Suitable additives are more fully described in, for example, U.S. Patent Application Publication No. 2003/0225197, the entire disclosure of which is hereby incorporated herein by reference.

In a particular embodiment, the HNP outer core layer composition has a moisture vapor transmission rate (MVTR) of 8 g-mil/100 in$^2$/day or less (i.e., 3.2 g-mm/m$^2$·day or less), or 5 g-mil/100 in$^2$/day or less (i.e., 2.0 g-mm/m$^2$·day or less), or 3 g-mil/100 in$^2$/day or less (i.e., 1.2 g-mm/m$^2$·day or less), or 2 g-mil/100 in$^2$/day or less (i.e., 0.8 g-mm/m$^2$·day or less), or 1 g-mil/100 in$^2$/day or less (i.e., 0.4 g-mm/m$^2$·day or less), or less than 1 g-mil/100 in$^2$/day (i.e., less than 0.4 g-mm/m$^2$·day). Suitable moisture resistant HNP compositions are disclosed, for example, in U.S. Patent Application Publication Nos. 2005/0267240, 2006/0106175 and 2006/0293464, the entire disclosures of which are hereby incorporated herein by reference.

In another particular embodiment, a sphere formed from the HNP outer core layer composition has a compression of 70 or greater, or 80 or greater, or a compression within a range having a lower limit of 70 or 80 or 90 or 100 and an upper limit of 110 or 130 or 140.

HNP outer core layer compositions of the present invention are not limited by any particular method or any particular equipment for making the compositions. In a preferred embodiment, the composition is prepared by the following process. The acid polymer(s), preferably an ethylene/(meth) acrylic acid copolymer, optional melt flow modifier(s), and optional additive(s)/filler(s) are simultaneously or individually fed into a melt extruder, such as a single or twin screw extruder. A suitable amount of cation source is then added such that at least 80%, preferably at least 90%, more preferably at least 95%, and even more preferably 100%, of all acid groups present are neutralized. The acid polymer may be at least partially neutralized prior to the above process. The components are intensively mixed prior to being extruded as a strand from the die-head.

Suitable HNP outer core layer compositions of the present invention also include blends of HNPs with partially neutralized ionomers as disclosed, for example, in U.S. Patent Application Publication No. 2006/0128904, the entire disclosure of which is hereby incorporated herein by reference, and blends of HNPs with additional thermoplastic and elastomeric materials. Examples of thermoplastic materials suitable for blending include bimodal ionomers (e.g., as disclosed in U.S. Patent Application Publication No. 2004/0220343 and U.S. Pat. Nos. 6,562,906, 6,762,246 and 7,273,903, the entire disclosures of which are hereby incorporated herein by reference), ionomers modified with rosins (e.g., as disclosed in U.S. Patent Application Publication No. 2005/0020741, the entire disclosure of which is hereby incorporated by reference), soft and resilient ethylene copolymers (e.g., as disclosed U.S. Patent Application Publication No. 2003/0114565, the entire disclosure of which is hereby incorporated herein by reference), polyolefins, polyamides, polyesters, polyethers, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, ionomers and ionomeric precursors, acid copolymers, conventional HNPs, polyurethanes, grafted and non-grafted metallocene-catalyzed polymers, single-site catalyst polymerized polymers, high crystalline acid polymers, cationic ionomers, and combinations thereof.

Particular polyolefins suitable for blending include one or more, linear, branched, or cyclic, $C_2$-$C_{40}$ olefins, particularly polymers comprising ethylene or propylene copolymerized with one or more $C_2$-$C_{40}$ olefins, $C_3$-$C_{20}$ α-olefins, or $C_3$-$C_{10}$ α-olefins. Particular conventional HNPs suitable for blending include, but are not limited to, one or more of the HNPs disclosed in U.S. Pat. Nos. 6,756,436, 6,894,098, and 6,953,820, the entire disclosures of which are hereby incorporated herein by reference. Examples of elastomers suitable for blending include natural and synthetic rubbers, including, but not limited to, ethylene propylene rubber (EPR), ethylene propylene diene rubber (EPDM), styrenic block copolymer rubbers (such as SI, SIS, SB, SBS, SIBS, and the like, where S is styrene, I is isobutylene, and B is butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (cis and trans). Additional suitable blend polymers include those described in U.S. Pat. No. 5,981,658, for example at column 14, lines 30 to 56, the entire disclosure of which is hereby incorporated herein by reference. The blends described herein may be produced by post-reactor blending, by connecting reactors in series to make reactor blends, or by using more than one catalyst in the same reactor to produce multiple species of polymer. The polymers may be mixed prior to being put into an extruder, or they may be mixed in an extruder.

HNP outer core layer compositions of the present invention, in the neat (i.e., unfilled) form, preferably have a specific gravity of from 0.95 g/cc to 0.99 g/cc. Any suitable filler, flake, fiber, particle, or the like, of an organic or inorganic material may be added to the HNP composition to increase or decrease the specific gravity, particularly to adjust the weight distribution within the golf ball, as further disclosed in U.S. Pat. Nos. 6,494,795, 6,547,677, 6,743,123, 7,074,137, and 6,688,991, the entire disclosures of which are hereby incorporated herein by reference.

Suitable HNP compositions are further disclosed, for example, in U.S. Pat. Nos. 6,653,382, 6,756,436, 6,777,472, 6,894,098, 6,919,393, and 6,953,820, the entire disclosures of which are hereby incorporated herein by reference. Particularly suitable for use in forming outer core layers of golf balls of the present invention are the "relatively hard HNP compositions" disclosed in U.S. Patent Application Publication No. 2007/0207879, the "high modulus HNP compositions" disclosed in U.S. Pat. No. 7,207,903, and the highly neutralized acid polymer compositions disclosed in U.S. Pat. No. 6,994,638, the entire disclosures of which are hereby incorporated herein by reference.

The outer core layer is alternatively formed from a highly resilient thermoplastic polymer composition selected from Hytrel® thermoplastic polyester elastomers, commercially available from E. I. du Pont de Nemours and Company, and Pebax® thermoplastic polyether block amides, commercially available from Arkema Inc.

Additional materials suitable for forming the inner and outer core layers include the core compositions disclosed in U.S. Pat. No. 7,300,364, the entire disclosure of which is hereby incorporated herein by reference. For example, suitable core materials include HNPs neutralized with organic fatty acids and salts thereof, metal cations, or a combination of both. In addition to HNPs neutralized with organic fatty acids and salts thereof, core compositions may comprise at least one rubber material having a resilience index of at least about 40. Preferably the resilience index is at least about 50. The weight distribution of the cores disclosed herein can be varied to achieve certain desired parameters, such as spin rate, compression, and initial velocity.

Cover Structure

In one embodiment, the two-layer or three-layer core is enclosed with a dual-cover comprising an inner cover layer and an outer cover layer. According to an embodiment of the present invention, the surface hardness of the outer core layer's outer surface is greater than the material hardness of the inner cover layer. In a particular embodiment, the surface hardness of the outer core layer's outer surface ($H_{outer\ core\ surface}$) is greater than the material hardness of both the inner cover layer ($H_{inner\ cover\ material}$) and the outer cover layer ($H_{outer\ cover\ material}$).

The inner cover layer preferably has an outer surface hardness ($H_{inner\ cover\ surface}$) of 96 Shore C or less, or 95 Shore C or less, or an outer surface hardness within a range having a lower limit of 80 or 85 or 87 Shore C and an upper limit of 90 or 91 or 95 or 96 or 97 or 98 Shore C. For purposes of the present disclosure, the outer surface hardness of the inner cover layer ($H_{inner\ Cover\ surface}$) is measured according to the procedure given herein for measuring the outer surface hardness of a golf ball layer.

The inner cover layer preferably has a material hardness ($H_{inner\ cover\ material}$) of 95 Shore C or less, or less than 95 Shore C, or 92 Shore C or less, or 90 Shore C or less, or has a material hardness ($H_{inner\ cover\ material}$) within a range having a lower limit of 70 or 75 or 80 or 84 or 85 or 87 Shore C and an upper limit of 90 or 91 or 92 or 95 Shore C. In one preferred embodiment, the inner cover layer is formed from a thermoplastic composition and has a material hardness ($H_{inner\ cover\ material}$) of 80 to 95 Shore C. In another preferred embodiment, $H_{outer\ core\ surface}$ is 85 Shore C or greater and $H_{inner\ cover\ material}$ is 84 Shore C to 92 Shore C. The thickness of the inner cover layer is preferably within a range having a lower limit of 0.010 or 0.015 or 0.020 or 0.025 or 0.030 inches and an upper limit of 0.035 or 0.045 or 0.050 or 0.080 or 0.120 or 0.150 inches.

The outer cover layer preferably has an outer surface hardness ($H_{outer\ cover\ surface}$) within a range having a lower limit of 20 or 30 or 35 or 40 Shore D and an upper limit of 52 or 58 or 60 or 65 or 70 or 72 or 75 Shore D.

The outer cover layer preferably has a material hardness ($H_{outer\ cover\ material}$) of 85 Shore C or less. The thickness of the outer cover layer is preferably within a range having a lower limit of 0.010 or 0.015 or 0.020 or 0.025 inches and an upper limit of 0.035 or 0.040 or 0.050 or 0.055 or 0.080 inches.

Optionally, one or more intermediate cover layer(s) may be included in the cover structure and generally each intermediate cover layer has a thickness within a range having a lower limit of 0.010 or 0.020 or 0.025 inches and an upper limit of 0.050 or 0.150 or 0.200 inches. Thus, as shown in FIG. 3, the present invention provides a golf ball having a multi-layered cover including an inner cover layer 58, an intermediate cover layer 60, and an outer cover layer 62. The intermediate cover layer preferably has an outer surface hardness ($H_{intermediate\ cover\ surface}$) of 85 Shore C or greater, or an outer surface hardness within a range having a lower limit of 83, 86, 87, 89, or 91 Shore C and an upper limit of 90 or 91 or 95 or greater Shore C. As measured in Shore D, the outer surface hardness ($H_{intermediate\ cover\ surface}$) preferably is 50 Shore D or greater and preferably is within a range having a lower limit of 50, 53, 55, 57, 60, 61, or 63 and an upper limit of 60, 62, 63, 65, 67, 70, 72, 73, or 75 Shore D. For purposes of the present disclosure, the outer surface hardness of the intermediate cover layer ($H_{intermediate\ cover\ surface}$) is measured according to the procedure given herein for measuring the outer surface hardness of a golf ball layer.

The intermediate cover layer preferably has a material hardness ($H_{intermediate\ cover\ material}$) of 98 Shore C or less, or less than 96 Shore C, or 95 Shore C or less, or 93 Shore C or less, or has a material hardness ($H_{intermediate\ cover\ material}$) within a range having a lower limit of 80 or 84 or 85 or 87 Shore C and an upper limit of 89 or 90 or 91 or 92 or 95 or 97 or 99 Shore C. The thickness of the intermediate cover layer is preferably within a range having a lower limit of 0.010 or 0.015 or 0.020 or 0.025 or 0.030 inches and an upper limit of 0.035 or 0.045 or 0.050 or 0.080 or 0.120 or 0.150 inches.

The intermediate cover layer may comprise any of the cover materials disclosed herein and preferably comprises an ionomer or a blend of two or more ionomers. In one embodiment, the intermediate cover layer comprises a blend of a high acid and a low acid ionomer such as Surlyn® 8150 with Surlyn® 7940 or a blend of high acid ionomers such as Surlyn® 8150 and 9150 or 8546. In a preferred embodiment the intermediate cover layer has a material hardness ($H_{intermediate\ cover\ material}$) greater than the material hardness of the inner cover layer ($H_{inner\ cover\ material}$) and a surface hardness ($H_{intermediate\ cover\ surface}$) greater than the surface hardness of the inner cover layer ($H_{inner\ cover\ surface}$).

The dual or multi-layered cover of the golf ball preferably has an overall thickness within a range having a lower limit of 0.010 or 0.020 or 0.025 or 0.030 or 0.040 or 0.045 or 0.050 or 0.060 inches and an upper limit of 0.070 or 0.075 or 0.080 or 0.090 or 0.100 or 0.150 or 0.200 or 0.300 or 0.500 inches.

Cover materials are preferably cut-resistant materials, selected based on the desired performance characteristics. Suitable inner and outer cover layer materials for the golf balls disclosed herein include, but are not limited to, ionomer resins and blends thereof (e.g., Surlyn® ionomer resins and DuPont® HPF 1000 and HPF 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyurethanes; polyureas; copolymers and hybrids of polyurethane and polyurea; polyethylene, including, for example, low density polyethylene, linear low density polyethylene, and high density polyethylene; polypropylene; rubber-toughened olefin polymers; acid copolymers, e.g., (meth)acrylic acid, which do not become part of an ionomeric copolymer; plastomers; flexomers; styrene/butadiene/styrene block copolymers; styrene/ethylene/butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether block amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof. Suitable cover materials and constructions also include, but are not limited to, those disclosed in U.S. Pat. Nos. 6,117,025, 6,767,940, and 6,960,630, the entire disclosures of which are hereby incorporated herein by reference.

Compositions comprising an ionomer or a blend of two or more ionomers are particularly suitable for forming the inner cover layer in dual-layer covers. Preferred ionomeric compositions include:

(a) a composition comprising a "high acid ionomer" (i.e., having an acid content of greater than 16 wt %), such as Surlyn 8150®, a copolymer of ethylene and methacrylic acid, having an acid content of 19 wt %, which is 45% neutralized with sodium;

(b) a composition comprising a high acid ionomer and a maleic anhydride-grafted non-ionomeric polymer (e.g., Fusabond® maleic anhydride-grafted metallocene-catalyzed ethylene-butene copolymers). A particularly preferred blend of high acid ionomer and maleic anhydride-grafted polymer is a blend of 79-85 wt % Surlyn 8150® and 15-21 wt % Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference;

(c) a composition comprising a 50/45/5 blend of Surlyn® 8940/Surlyn® 9650/Nucrel® 960, preferably having a material hardness of from 80 to 85 Shore C;

(d) a composition comprising a 50/25/25 blend of Surlyn® 8940/Surlyn® 9650/Surlyn® 9910, preferably having a material hardness of about 90 Shore C;

(e) a composition comprising a 50/50 blend of Surlyn® 8940/Surlyn® 9650, preferably having a material hardness of about 86 Shore C;

(f) a composition comprising a blend of Surlyn® 7940/Surlyn® 8940, optionally including a melt flow modifier;

(g) a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9150), optionally including one or more melt flow modifiers such as an ionomer, ethylene-acid copolymer or ester terpolymer; and (h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8140, 40-50 wt % Surlyn® 9120, and 0-10 wt % Surlyn® 6320).

Surlyn 8150®, Surlyn® 8940, and Surlyn® 8140 are different grades of E/MAA copolymer in which the acid groups have been partially neutralized with sodium ions. Surlyn® 9650, Surlyn® 9910, Surlyn® 9150, and Surlyn® 9120 are different grades of E/MAA copolymer in which the acid groups have been partially neutralized with zinc ions. Surlyn® 7940 is an E/MAA copolymer in which the acid groups have been partially neutralized with lithium ions. Surlyn® 6320 is a very low modulus magnesium ionomer with a medium acid content. Nucrel® 960 is an E/MAA copolymer resin nominally made with 15 wt % methacrylic acid. Surlyn® ionomers, Fusabond® copolymers, and Nucrel® copolymers are commercially available from E. I. du Pont de Nemours and Company.

Non-limiting examples of particularly preferred ionomeric cover layer formulations are shown in Table 1 below.

TABLE 1

| Cover Layer Material | Surlyn ® 8150, wt % | Fusabond ®, wt % | Shore C Hardness* |
|---|---|---|---|
| 1 | 89 | 11 | 91.2 |
| 2 | 84 | 16 | 89.8 |
| 3 | 84 | 16 | 90.4 |
| 4 | 84 | 16 | 89.6 |
| 5 | 81 | 19 | 88.9 |
| 6 | 80 | 20 | 89.1 |
| 7 | 78 | 22 | 88.1 |
| 8 | 76 | 24 | 87.6 |
| 9 | 76 | 24 | 87.2 |
| 10 | 73 | 27 | 86.6 |
| 11 | 71 | 29 | 86.7 |
| 12 | 67 | 33 | 84.0 |

*Flex bars of each blend composition were formed and evaluated for hardness according to ASTM D2240 following 10 days of aging at 50% relative humidity and 23° C.

Ionomeric cover compositions can be blended with non-ionic thermoplastic resins, particularly to manipulate product properties. Examples of suitable non-ionic thermoplastic resins include, but are not limited to, polyurethane, polyether-ester, poly-amide-ether, polyether-urea, thermoplastic polyether block amides (e.g., Pebax® block copolymers, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, polyethylene-(meth)acrylic acid, functionalized polymers with maleic anhydride grafting, Fusabond® functionalized olefins commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Polyurethanes, polyureas, and copolymers and blends thereof are particularly suitable for forming the outer cover layer in dual-layer covers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

Suitable polyurethane cover materials are further disclosed in U.S. Pat. Nos. 5,334,673, 6,506,851, 6,756,436, and 7,105,623, the entire disclosures of which are hereby incorporated herein by reference. Suitable polyurea cover materials are further disclosed in U.S. Pat. Nos. 5,484,870, 6,835,794 and 7,378,483, and U.S. Patent Application Publication No. 2008/0064527, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Golf ball cover compositions may include a flow modifier, such as, but not limited to, Nucrel® acid copolymer resins, and particularly Nucrel® 960. Nucrel® acid copolymer resins are commercially available from E. I. du Pont de Nemours and Company.

Cover compositions may also include one or more filler(s), such as the fillers given above for rubber compositions of the present invention (e.g., titanium dioxide, barium sulfate, etc.), and/or additive(s), such as coloring agents, fluorescent agents, whitening agents, antioxidants, dispersants, UV absorbers, light stabilizers, plasticizers, surfactants, compatibility agents, foaming agents, reinforcing agents, release agents, and the like.

In a particular embodiment, the cover comprises an inner cover layer formed from a composition comprising a high acid ionomer and a maleic anhydride-grafted non-ionomeric polymer and an outer cover layer formed from a polyurethane, polyurea, or copolymer or hybrid of polyurethane/polyurea. The outer cover layer material may be thermoplastic or thermoset. A particularly preferred inner cover layer composition is a 84 wt %/16 wt % blend of Surlyn 8150® and Fusabond 572D®.

Additional suitable cover materials are disclosed, for example, in U.S. Patent Application Publication No. 2005/0164810, U.S. Pat. No. 5,919,100, and PCT Publications WO00/23519 and WO00/29129, the entire disclosures of which are hereby incorporated herein by reference.

In addition to the material disclosed above, any of the core or cover layers may comprise one or more of the following materials: thermoplastic elastomer, thermoset elastomer, synthetic rubber, thermoplastic vulcanizate, copolymeric ionomer, terpolymeric inomer, polycarbonate, polyolefin, polyamide, copolymeric polyamide, polyesters, polyesteramides, polyether-amides, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene-catalyzed polymers, styrene-acrylonitrile (SAN), olefin-modified SAN, acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene rubber (EPDM), ethylene-vinyl acetate copolymer (EVA), ethylene propylene rubber (EPR), ethylene vinyl acetate, polyurea, and polysiloxane. Suitable polyamides for use as an additional material in compositions disclosed herein also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerzation of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other preferred materials suitable for use as an additional material in golf ball compositions disclosed herein include Skypel polyester elastomers, commercially available from SK Chemicals of South Korea; Septon® diblock and triblock copolymers, commercially available from Kuraray Corporation of Kurashiki, Japan; and Kraton® diblock and triblock copolymers, commercially available from Kraton Polymers LLC of Houston, Tex. Compositions disclosed herein can be either foamed or filled with density adjusting materials to provide desirable golf ball performance characteristics.

Manufacturing Processes

The present invention is not limited by any particular process for forming the golf ball layer(s). It should be understood that the layer(s) can be formed by any suitable technique, including injection molding, compression molding, casting, and reaction injection molding.

When injection molding is used, the composition is typically in a pelletized or granulated form that can be easily fed into the throat of an injection molding machine wherein it is melted and conveyed via a screw in a heated barrel at temperatures of from 150° F. to 600° F., preferably from 200° F. to 500° F. The molten composition is ultimately injected into a closed mold cavity, which may be cooled, at ambient or at an elevated temperature, but typically the mold is cooled to a temperature of from 50° F. to 70° F. After residing in the closed mold for a time of from 1 second to 300 seconds, preferably from 20 seconds to 120 seconds, the core and/or core plus one or more additional core or cover layers is removed from the mold and either allowed to cool at ambient or reduced temperatures or is placed in a cooling fluid such as water, ice water, dry ice in a solvent, or the like.

When compression molding is used to form a core, the composition is first formed into a preform or slug of material, typically in a cylindrical or roughly spherical shape at a weight slightly greater than the desired weight of the molded core. Prior to this step, the composition may be first extruded or otherwise melted and forced through a die after which it is cut into a cylindrical preform. The preform is then placed into a compression mold cavity and compressed at a mold temperature of from 150° F. to 400° F., preferably from 250° F. to 400° F., and more preferably from 300° F. to 400° F. When compression molding a cover layer, half-shells of the cover layer material are first formed via injection molding. A core is then enclosed within two half-shells, which is then placed into a compression mold cavity and compressed.

Reaction injection molding processes are further disclosed, for example, in U.S. Pat. Nos. 6,083,119, 7,208,562, 7,281,997, 7,282,169, 7,338,391, and U.S. Patent Application Publication No. 2006/0247073, the entire disclosures of which are hereby incorporated herein by reference.

Golf Ball Properties

Golf balls of the present invention typically have a coefficient of restitution (COR) of 0.700 or greater, preferably 0.750 or greater, more preferably 0.780 or greater, and even more preferably 0.790 or greater.

COR, as used herein, is determined according to a known procedure wherein a golf ball or golf ball subassembly (e.g., a golf ball core) is fired from an air cannon at two given velocities and calculated at a velocity of 125 ft/s. Ballistic light screens are located between the air cannon and the steel plate at a fixed distance to measure ball velocity. As the ball travels toward the steel plate, it activates each light screen, and the time at each light screen is measured. This provides an incoming transit time period inversely proportional to the ball's incoming velocity. The ball impacts the steel plate and rebounds though the light screens, which again measure the time period required to transit between the light screens. This provides an outgoing transit time period inversely proportional to the ball's outgoing velocity. COR is then calculated as the ratio of the outgoing transit time period to the incoming transit time period, $COR=V_{out}/V_{in}=T_{in}/T_{out}$.

Golf balls of the present invention typically have an overall compression of 40 or greater, or a compression within a range having a lower limit of 40 or 50 or 60 or 65 or 75 or 80 or 90 and an upper limit of 95 or 100 or 105 or 110 or 115 or 120. Dual cores of the present invention preferably have an overall compression of 60 or 70 or 75 or 80 and an upper limit of 85 or 90 or 95 or 100. Inner core layers of the present invention preferably have a compression of 40 or less, or from 20 to 40, or a compression of about 35.

Compression is an important factor in golf ball design. For example, the compression of the core can affect the ball's spin rate off the driver and the feel. As disclosed in Jeff Dalton's *Compression by Any Other Name, Science and Golf IV, Proceedings of the World Scientific Congress of Golf* (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton.

Figure 4:
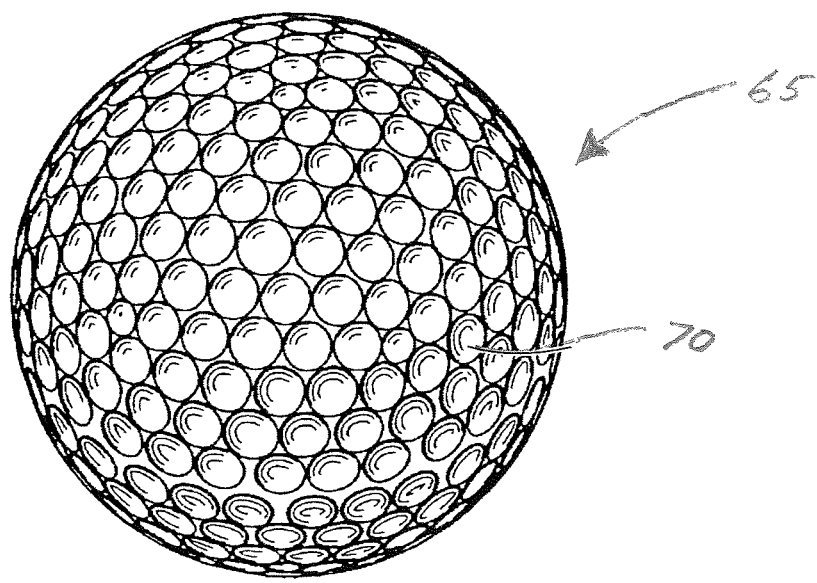
FIG. 4 is a perspective view of a finished golf ball according to an embodiment of the present invention.

In FIG. 4, one version of a finished golf ball that can be made in accordance with this invention is generally indicated at 65. Various patterns and geometric shapes of dimples 70 can be used to modify the aerodynamic properties of the golf ball 65 as needed. Golf balls of the present invention will typically have dimple coverage of 60% or greater, preferably 65% or greater, and more preferably 75% or greater.

The United States Golf Association specifications limit the minimum size of a competition golf ball to 1.680 inches. There is no specification as to the maximum diameter, and golf balls of any size can be used for recreational play. Golf balls of the present invention can have an overall diameter of any size. The preferred diameter of the present golf balls is from 1.680 inches to 1.800 inches. More preferably, the present golf balls have an overall diameter of from 1.680 inches to 1.760 inches, and even more preferably from 1.680 inches to 1.740 inches.

Golf balls of the present invention preferably have a moment of inertia (MOI) of 70-95 $g \cdot cm^2$, preferably 75-93 $g \cdot cm^2$, and more preferably 76-90 $g \cdot cm^2$. For low MOI embodiments, the golf ball preferably has an MOI of 85 $g \cdot cm^2$ or less, or 83 $g \cdot cm^2$ or less. For high MOI embodiment, the golf ball preferably has an MOI of 86 $g \cdot cm^2$ or greater, or 87 $g \cdot cm^2$ or greater. MOI is measured on a model MOI-005-104 Moment of Inertia Instrument manufactured by Inertia Dynamics of Collinsville, Conn. The instrument is connected to a PC for communication via a COMM port and is driven by MOI Instrument Software version #1.2.

In one embodiment, the present invention relates generally to golf balls containing at least one component made from a thermoplastic non-ionomer composition and at least one component made from a thermoplastic ionomer composition.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball consisting essentially of:
    an inner core layer formed from a thermoplastic composition and having a center hardness ($H_{center}$) of 60 Shore C or greater, and an outer surface hardness ($H_{center\ surface}$) of 80 Shore C or greater;
    an intermediate core layer formed from a thermoplastic composition having a material hardness ($H_{intermediate\ core\ material}$) of 83 Shore C or greater;
    an outer core layer formed from a highly neutralized polymer composition having a material hardness ($H_{outer\ core\ material}$) of 35 Shore D or greater;
    an inner cover layer formed from a thermoplastic composition having a material hardness ($H_{inner\ cover\ material}$) of 95 Shore C or less; and
    an outer cover layer formed from a composition selected from the group consisting of ionomeric and non-ionomeric E/X- and E/X/Y-type acid copolymers of ethylene (E), a $C_3$-$C_8$ α,β-ethylenically unsaturated carboxylic acid (X), and an optional softening monomer (Y); and blends of two or more thereof;
    wherein a core structure consisting of the inner core layer, the intermediate core layer, and the outer core layer has a diameter of from 1.40 inches to 1.55 inches.

2. The golf ball of claim 1, wherein $H_{intermediate\ core\ material}$ is greater than $H_{outer\ core\ material}$.

3. The golf ball of claim 1, wherein the inner core layer has a diameter of 0.50 inches or greater.

4. A golf ball consisting essentially of:
    an inner core layer formed from a thermoplastic composition and having a center hardness ($H_{center}$) of from 50

Shore C to 75 Shore C, and an outer surface hardness ($H_{center\ surface}$) of from 60 Shore C to 85 Shore C;

an intermediate core layer formed from a thermoplastic composition having a material hardness ($H_{intermediate\ core\ material}$) of 83 Shore C or greater;

an outer core layer formed from a highly neutralized polymer composition and having an outer surface hardness ($H_{outer\ core\ surface}$) of from 70 Shore C to 95 Shore C;

an inner cover layer formed from a thermoplastic composition having a material hardness ($H_{inner\ cover\ material}$) of from 80 Shore C to 95 Shore C; and an outer cover layer formed from a composition selected from the group consisting of ionomeric and non-ionomeric E/X- and E/X/Y-type acid copolymers of ethylene (E), a $C_3$-$C_8$ α,β-ethylenically unsaturated carboxylic acid (X), and an optional softening monomer (Y); and blends of two or more thereof.

5. The golf ball of claim 4, wherein $H_{intermediate\ core\ material}$ is greater than $H_{outer\ core\ material}$.

6. The golf ball of claim 4, wherein the inner core layer has a diameter of 0.50 inches or greater.

* * * * *